(12) United States Patent
Matsui

(10) Patent No.: US 11,314,025 B2
(45) Date of Patent: Apr. 26, 2022

(54) OPTICAL TRANSCEIVER

(71) Applicant: SUMITOMO ELECTRIC INDUSTRIES, LTD., Osaka (JP)

(72) Inventor: Takashi Matsui, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/148,935

(22) Filed: Jan. 14, 2021

(65) Prior Publication Data

US 2021/0223490 A1  Jul. 22, 2021

(30) Foreign Application Priority Data

Jan. 20, 2020 (JP) .............................. JP2020-006631

(51) Int. Cl.
| | |
|---|---|
| *H04B 10/00* | (2013.01) |
| *G02B 6/42* | (2006.01) |
| *H04B 10/40* | (2013.01) |

(52) U.S. Cl.
CPC ......... *G02B 6/4256* (2013.01); *G02B 6/4213* (2013.01); *G02B 6/4246* (2013.01); *H04B 10/40* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 5,917,648 | A | * | 6/1999 | Harker | H01S 3/06704 |
| | | | | | 359/341.3 |
| 5,920,668 | A | * | 7/1999 | Uehara | H01S 3/06704 |
| | | | | | 385/27 |
| 6,802,652 | B1 | * | 10/2004 | Sacchetto | G02B 6/4453 |
| | | | | | 385/135 |
| 7,359,641 | B2 | * | 4/2008 | Dallesasse | G02B 6/4277 |
| | | | | | 398/135 |
| 9,319,142 | B2 | * | 4/2016 | Kato | G02B 6/4213 |
| 9,871,590 | B2 | * | 1/2018 | Matsui | G02B 6/4246 |
| 10,502,909 | B2 | * | 12/2019 | Minota | G02B 6/4278 |
| 10,558,063 | B2 | * | 2/2020 | Sugaya | G02F 1/015 |
| 10,578,802 | B2 | * | 3/2020 | Minota | G02B 6/255 |
| 10,754,091 | B1 | * | 8/2020 | Nagarajan | H01S 5/02375 |
| 11,036,017 | B2 | * | 6/2021 | Tittenhofer | G02B 6/4256 |
| 11,204,464 | B2 | * | 12/2021 | Minota | G02B 6/4454 |

(Continued)

FOREIGN PATENT DOCUMENTS

JP      2015-079092      4/2015

*Primary Examiner* — Agustin Bello
(74) *Attorney, Agent, or Firm* — IPUSA, PLLC

(57) ABSTRACT

An optical transceiver that is hot-pluggable to an external device includes: an IC-TROSA including first to third internal fibers extending from a first surface of a package on a side opposite to the device in the first direction; a first substrate on which the IC-TROSA is mounted; a second substrate electrically connected to a light source and the first substrate and to which the light source is attached to generate reference light; a first sleeve provided on the second internal fiber; a second sleeve provided on the third internal fiber; and a fiber tray in which the substrates are mounted in an upper portion and the fibers are housed in a lower portion by being bent greater than a predetermined radius of curvature. The second substrate is arranged between the first and second sleeves and the first substrate in the first direction.

9 Claims, 17 Drawing Sheets

(56) References Cited

U.S. PATENT DOCUMENTS

| | | | | |
|---|---|---|---|---|
| 2006/0274394 A1* | 12/2006 | Riley | G02B 7/003 | 359/15 |
| 2011/0103797 A1* | 5/2011 | Oki | G02B 6/4243 | 398/79 |
| 2012/0237171 A1* | 9/2012 | Oki | G02B 6/4277 | 385/78 |
| 2014/0010551 A1* | 1/2014 | Kurashima | G02B 6/4246 | 398/135 |
| 2015/0104177 A1* | 4/2015 | Kato | G02B 6/4246 | 398/79 |
| 2015/0326319 A1* | 11/2015 | Oki | H04B 10/556 | 398/135 |
| 2016/0103286 A1* | 4/2016 | Matsui | G02B 6/4246 | 398/139 |
| 2016/0266336 A1* | 9/2016 | Oki | H04B 10/40 | |
| 2018/0113262 A1* | 4/2018 | Aoki | G02B 6/4448 | |
| 2018/0149814 A1* | 5/2018 | Minota | G02B 6/4278 | |
| 2018/0231726 A1* | 8/2018 | Mizuno | H04B 10/505 | |
| 2018/0343062 A1* | 11/2018 | Voois | H04B 10/58 | |
| 2019/0243077 A1* | 8/2019 | Meunier | G02B 6/444 | |
| 2019/0327000 A1* | 10/2019 | Kurokawa | G02B 27/0961 | |
| 2019/0353844 A1* | 11/2019 | Nakanishi | G02B 6/30 | |
| 2020/0150366 A1* | 5/2020 | Tittenhofer | G02B 6/4256 | |
| 2020/0195350 A1* | 6/2020 | Matsui | G02B 6/4281 | |
| 2020/0322057 A1* | 10/2020 | Cai | H04B 10/40 | |
| 2020/0393632 A1* | 12/2020 | Wallace | G02B 6/4453 | |
| 2021/0165174 A1* | 6/2021 | Minota | H01S 3/10 | |
| 2021/0223490 A1* | 7/2021 | Matsui | G02B 6/4246 | |
| 2021/0364713 A1* | 11/2021 | Ariga | G02B 6/4267 | |
| 2021/0389535 A1* | 12/2021 | Yagisawa | G02B 6/4277 | |

\* cited by examiner

OPTICAL TRANSCEIVER

CROSS-REFERENCE TO RELATED APPLICATION

The present application is based upon and claims priority to Japanese Patent Application No. 2020-006631, filed on Jan. 20, 2020, the entire contents of which are incorporated herein by reference.

BACKGROUND OF THE INVENTION

1. Field of the Invention

The present disclosure relates to an optical transceiver.

2. Description of the Related Art

An optical transceiver is disclosed that includes a wavelength tunable semiconductor laser diode, an optical transmitter, and an optical receiver (for example, Patent Document 1).

PRIOR ART DOCUMENT

Patent Document

[Patent Document 1] Japanese Laid-open Patent Publication No. 2015-079092

Optical transceivers are used in optical transmission devices or the like that form optical communication networks. In order to accommodate rapidly increasing data traffic year by year, high-speed and large-capacity optical communication networks are required.
The transmission capacity per device can be increased by increasing the mounting density of the optical transceiver in the optical transmission device. In order to enhance the mounting density, it is necessary to reduce the size of optical transceivers as the product generations change.

Accordingly, the present disclosure has an object to provide an optical transceiver than can realize further reduction in size.

SUMMARY OF THE INVENTION

According to one aspect of the present disclosure, an optical transceiver that is hot-pluggable to an external device in a first direction includes an IC-TROSA (Integrated Coherent-Transmitter Receiver Optical Sub-Assembly) including a package having a rectangular parallelepiped external shape; a first internal fiber; a second internal fiber; a third internal fiber; and an optical circuit element, wherein the package has a first surface on a side opposite to the device in the first direction, wherein the first internal fiber, the second internal fiber, and the third internal fiber extend from the first surface in proximity to each other, wherein the optical circuit element is housed inside the package, and wherein the IC-TROSA generates, based on reference light input through the first internal fiber, transmitted light to be output through the second internal fiber, and causes received light input through the third internal fiber to optically interfere with the reference light. The optical transceiver further includes: a light source having a rectangular parallelepiped external shape, that is connected to the first internal fiber, and that is configured to generate the reference light; a first substrate having a rectangular parallelepiped external shape that is long in the first direction and having a second surface that is parallel to the first direction and a second direction, which is perpendicular to the first direction, the IC-TROSA being mounted on the second surface such that the first surface faces a side opposite to the device in the first direction; a second substrate having a third surface that is parallel to the first direction and the second direction and that is electrically connected to the light source and the first substrate, the light source being attached to the second substrate; a first sleeve provided on the second internal fiber and that is connectable to an external connector; a second sleeve provided on the third internal fiber and that is connectable to an external connector; and a fiber tray having a rectangular parallelepiped external shape that is long in the first direction and having an upper portion and a lower portion in a third direction perpendicular to the first direction and the second direction, the first substrate and the second substrate being mounted in the upper portion such that respective back surfaces of the second surface and the third surface face the lower portion, the first internal fiber, the second internal fiber, and the third internal fiber being housed in the lower portion in a state in which the first internal fiber, the second internal fiber, and the third internal fiber are bent at a radius of curvature greater than a predetermined radius of curvature, wherein the second substrate is arranged between sleeves, which are the first sleeve and the second sleeve, and the first substrate in the first direction.

According to the present disclosure, it is possible to realize further reduction in size.

DESCRIPTION OF THE PREFERRED EMBODIMENTS

Figure 1:
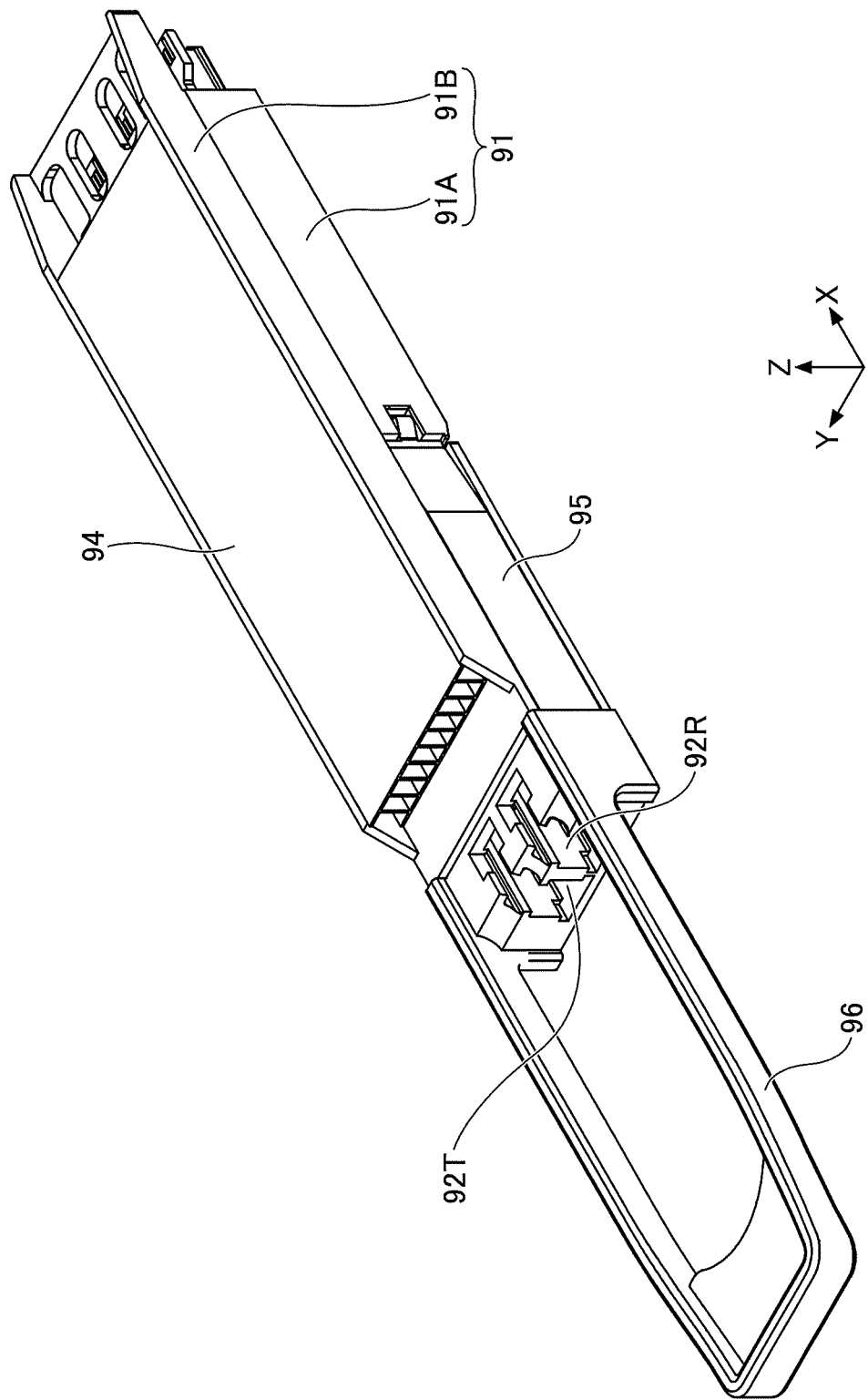
FIG. 1 is a perspective view illustrating an optical transceiver according to an embodiment.

An embodiment for carrying out will be described below.

Description of Embodiment of the Present Disclosure

To begin with, aspects of the present disclosure are listed and described below. In the following description, the same reference characters are allotted to the same or corresponding elements and the same descriptions thereof are not repeated.

<1> According to one aspect of the present disclosure, an optical transceiver that is hot-pluggable to an external device in a first direction includes an IC-TROSA including a package having a rectangular parallelepiped external shape; a first internal fiber; a second internal fiber; a third internal fiber; and an optical circuit element, wherein the package has a first surface on a side opposite to the device in the first direction, wherein the first internal fiber, the second internal fiber, and the third internal fiber extend from the first surface in proximity to each other, wherein the optical circuit element is housed inside the package, and wherein the IC-TROSA generates, based on reference light input through the first internal fiber, transmitted light to be output through the second internal fiber, and causes received light input through the third internal fiber to optically interfere with the reference light. The optical transceiver further includes: a light source having a rectangular parallelepiped external shape, that is connected to the first internal fiber, and that is configured to generate the reference light; a first substrate having a rectangular parallelepiped external shape that is long in the first direction and having a second surface that is parallel to the first direction and a second direction, which is perpendicular to the first direction, the IC-TROSA being mounted on the second surface such that the first surface faces a side opposite to the device in the first direction; a second substrate having a third surface that is parallel to the first direction and the second direction and that is electrically connected to the light source and the first substrate, the light source being attached to the second substrate; a first sleeve provided on the second internal fiber and that is connectable to an external connector; a second sleeve provided on the third internal fiber and that is connectable to an external connector; and a fiber tray having a rectangular parallelepiped external shape that is long in the first direction and having an upper portion and a lower portion in a third direction perpendicular to the first direction and the second direction, the first substrate and the second substrate being mounted in the upper portion such that respective back surfaces of the second surface and the third surface face the lower portion, the first internal fiber, the second internal fiber, and the third internal fiber being housed in the lower portion in a state in which the first internal fiber, the second internal fiber, and the third internal fiber are bent at a radius of curvature greater than a predetermined radius of curvature, wherein the second substrate is arranged between sleeves, which are the first sleeve and the second sleeve, and the first substrate in the first direction.

The first substrate on which the IC-TROSA is mounted and the second substrate to which the light source is attached are mounted in the upper portion of the fiber tray and the first internal fiber, the second internal fiber, and the third internal fiber are housed in the lower portion of the fiber tray. Thus, the space in which the first substrate and the second substrate are mounted and the space in which the first internal fiber, the second internal fiber, and the third internal fiber are housed can be separated in the third direction. Also, in the first direction, the second substrate is arranged between sleeves, which are the first sleeve and the second sleeve, and the first substrate. Therefore, the portion of the first internal fiber, the second internal fiber, and the third internal fiber extending from the first surface and the second substrate can be arranged in line in the second direction, the dimension in the first direction can be reduced. Thus, the optical transceiver can be reduced in size.

<2> According to <1>, a position of the first substrate may be different from a position of the second substrate in the third direction. In this case, it is possible to align the upper surface of the package of the IC-TROSA and the upper surface of the light source module, and it is possible to efficiently use the space of the upper portion of the fiber tray.

<3> According to <1> or <2>, the second substrate may have a fourth surface facing the first surface, a cutout being formed on the fourth surface, and the first internal fiber, the second internal fiber, and the third internal fiber may be housed in the lower portion through the cutout. In this case, it is possible to avoid interference between the first internal fiber, the second internal fiber, the third internal fiber, and the second wiring substrate at the upper portion of the fiber tray.

<4> According to <1> to <3>, the IC-TROSA may include a boot that bundles the first internal fiber, the second internal fiber, and the third internal fiber, and in the second direction, the boot and the light source may be arranged in line. In this case, it is possible to efficiently use, between sleeves, which are the first sleeve and the second sleeve, and the first substrate, the space of the upper portion of the fiber tray 40.

<5> According to <1> to <4>, the light source may include an output port on a side opposite to the first substrate in the first direction. In this case, it is possible to avoid interference between the output port and the first internal fiber and the first substrate optically coupled to the output port.

<6> According to <1> to <5>, the fiber tray may include a first wall portion and a second wall portion provided away from each other in the first direction and extending in the second direction; a third wall portion and a fourth wall portion provided away from each other in the second direction and extending in the first direction; and a guide portion provided between the first wall portion and the second wall portion between the third wall portion and the fourth wall portion and guiding, to the lower portion, the first internal fiber, the second internal fiber, and the third internal fiber extending from the first surface at the upper portion, wherein the first internal fiber, the second internal fiber, and the third internal fiber guided to the lower portion by the guide portion may be in proximity to the first wall portion, the third wall portion, the second wall portion, and the fourth wall portion in this order and may be housed in the lower portion. In this case, it is easy to greatly bend the first internal fiber, the second internal fiber, and the third internal fiber to be housed in the lower portion of the fiber tray.

<7> According to <1> to <6>, the fiber tray may include, at an end portion on a side opposite to the device in the first direction, a first holding portion that holds the first sleeve and a second holding portion that holds the second sleeve. In this case, light can be transmitted and received on the side opposite to the external device.

<8> According to <1> to <7>, the optical transceiver may include an optical connector provided on an end portion of the first internal fiber connected to the light source. In this case, it is easy to properly connect the first internal fiber and the light source.

<9> According to <1> to <8>, the optical transceiver may include a digital signal processing circuit that is mounted on the first substrate to be located between the IC-TROSA and the device and that is electrically connected to the IC-TROSA. In this case, the signal path between the IC-TROSA and the external device can be shortened and signal losses can be suppressed.

Embodiment of the Present Disclosure

An embodiment of the present disclosure relates to, for example, an optical transceiver that is hot-pluggable to a cage of a host system (optical transmission device). FIG. 1 is a perspective view illustrating an optical transceiver according to an embodiment. An XYZ Cartesian coordinate system is set for each drawing for convenience of description. The X axis direction is an example of a first direction, the Y axis direction is an example of a second direction, and the Z axis direction is an example of a third direction. In the present disclosure, a plan view means viewing from the Z axis direction.

As illustrated in FIG. 1, the optical transceiver 1 according to the embodiment includes a housing 91, a heat sink 94, a slider 95, and a pull tab 96.

The housing 91 has a planar shape having a longitudinal direction and a lateral direction. The housing 91 has a substantially rectangular parallelepiped shape that is long in the longitudinal direction. In the present embodiment, the longitudinal direction is along the X axis direction, and the lateral direction is along the Y axis direction. The lateral direction is the direction that intersects the longitudinal direction. The housing 91 includes a lower housing 91A and an upper housing 91B. The lower housing 91A and the upper housing 91B are arranged so as to face each other in the height direction. The height direction is along the Z axis direction. The height direction is a direction that intersects the longitudinal direction and the lateral direction. The lower housing 91A has an internal space for housing components inside. The internal space is open to the +Z side. The upper housing 91B is fixed to the lower housing 91A so as to cover and close the opening of the lower housing 91A. The lower housing 91A and the upper housing 91B are made of, for example, a metal.

On one end portion (−X side end portion) of the lower housing 91A in the X axis direction, a light receptacle 92T for transmission and a light receptacle 92R for reception are provided. The housing 91 can be inserted toward the +X side into a cage of a host system cage. Also, the housing 91 can be detached from the cage toward the −X side by holding the pull tab 96, which will be described later. The light receptacles 92T and 92R are, for example, LC type receptacles. For example, the light receptacle 92T is provided on the +Y side relative to the light receptacle 92R. The optical transceiver 1 transmits an optical signal through an optical fiber that is connected to the light receptacle 92T and receives an optical signal through another optical fiber that is connected to the light receptacle 92R. The light receptacle 92T and the light receptacle 92R are not housed within the cage when the housing 91 is inserted into the cage, but face outside the host system and are connectable to an optical connector provided at the tip of an optical fiber. In the following description, in the X axis direction, the side where the lower housing 91A has the light receptacles 92T and 92R (−X side) may be referred to as the front side and its opposite side (+X side) may be referred to as the rear side. The housing 91 has, for example, a dimension in the longitudinal direction greater than a dimension in the lateral direction and the dimension in the lateral direction is greater than a dimension in the height direction. For example, the dimension of the lower housing 91A in the X axis direction is 100.4 mm, the dimension of the lower housing 91A in the Y axis direction is 22.58 mm, and the dimension of the lower housing 91A in the Z axis direction is 9.2 mm.

The heat sink 94 is provided on the upper housing 91B. The heat sink 94 dissipates heat generated in the housing 91 to the outside. The heat sink 94 may be formed as a portion of the upper housing 91B. The slider 95 is attached to the lower housing 91A to be slidable in the X axis direction, and the pull tab 96 is fixed to the slider 95. The slider 95 has a function of disengaging the engagement of the cage of the host system and the housing 91. By pulling the pull tab 96 toward the front side, the slider 95 slides to disengage the engagement, and the optical transceiver 1 inserted in the cage of the host system can be pulled out from the cage. The heat sink 94 and the slider 95 are made of, for example, a metal. The pull tab 96 is made of a resin, for example.

Figure 2:
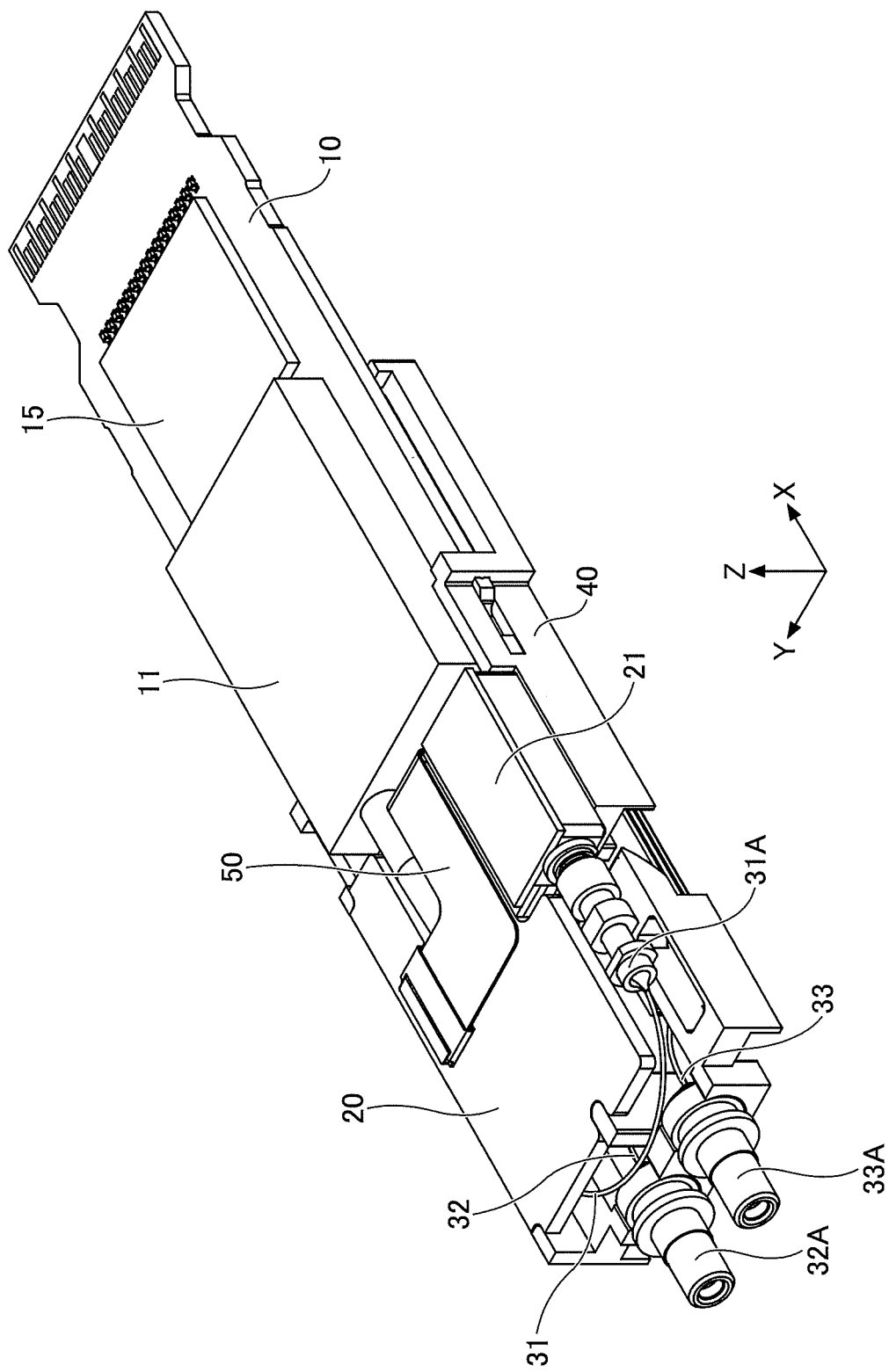
FIG. 2 is a perspective view of components housed in a housing.

Next, the components housed in the housing 91 will be described. FIG. 2 is a perspective view illustrating the components housed in the housing 91.

As illustrated in FIG. 2, the housing 91 contains a fiber tray 40, a first wiring substrate 10, a second wiring substrate 20, and a flexible print circuit board (FPC) 50. As will be described in later below, for example, an IC-TROSA 11 and a DSP 15 are mounted on the first wiring substrate 10, and a light source module 21 and a light source control circuit 25 are mounted on the second wiring substrate 20. The light source module 21 generates reference light. The IC-TROSA 11 includes a first internal fiber 31 through which reference light propagates, a second internal fiber 32 through which transmitted light propagates, and a third internal fiber 33 through which received light propagates. The fiber tray 40 is made, for example, of a resin. The fiber tray 40 may be formed, for example, of an engineering plastic having a stronger strength and higher heat resistance than those of a general-purpose plastic. By using a resin as a material, even a relatively complicated shape can be relatively easily manufactured by integral molding. Also, the fiber tray 40 is flexible and enables snap-fitting, which will be described later below. In addition, in a case in which a metallic material is used, a surface treatment is required. However, by using a resin material, it is possible to avoid the possibility that an outer coating of an internal fiber is damaged due to a trace of the surface treatment. The first wiring substrate 10 is an example of a first substrate, and the second wiring substrate 20 is an example of a second substrate.

Figure 3:
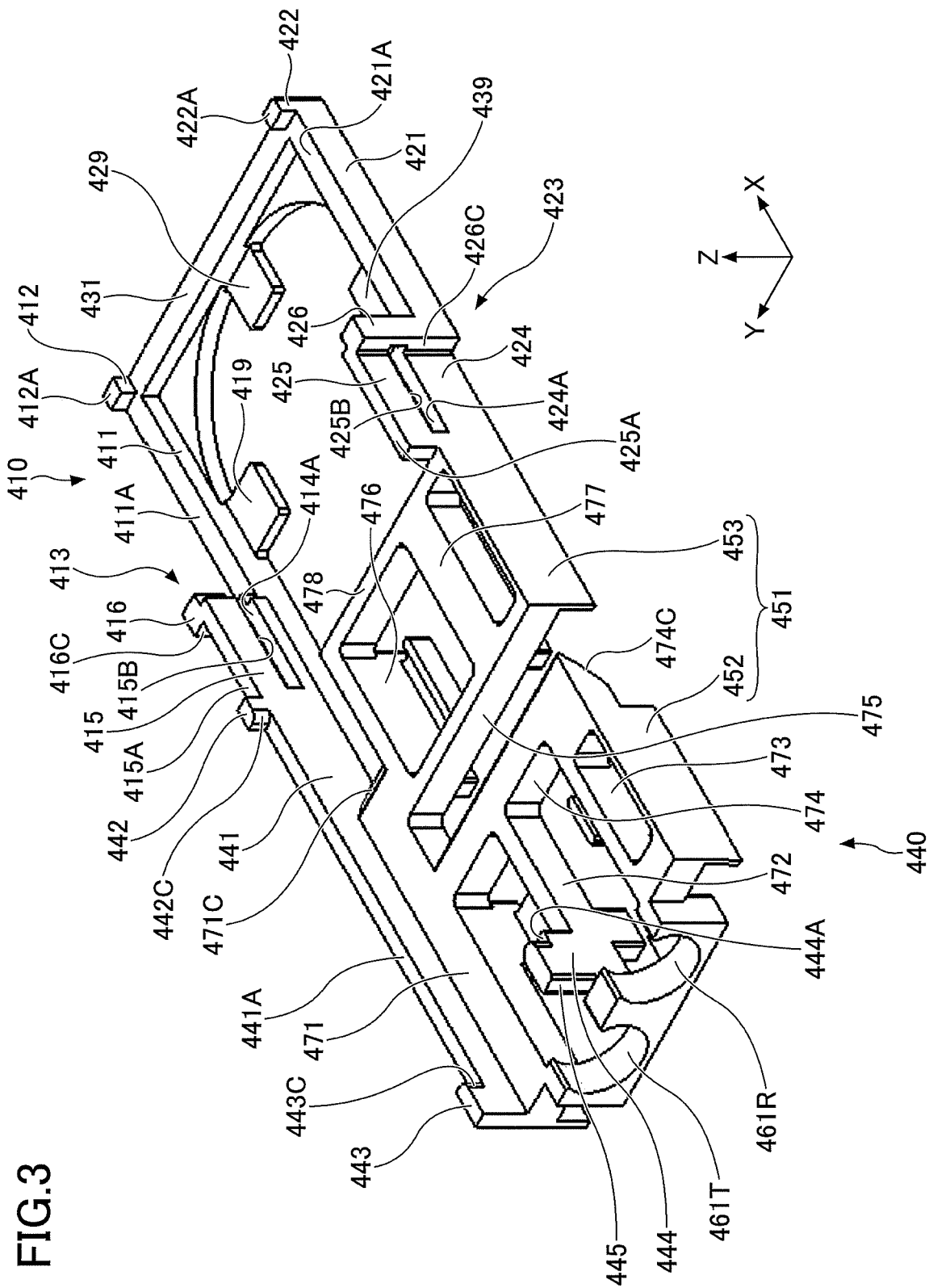
FIG. 3 is a perspective view illustrating a fiber tray.
Figure 4:
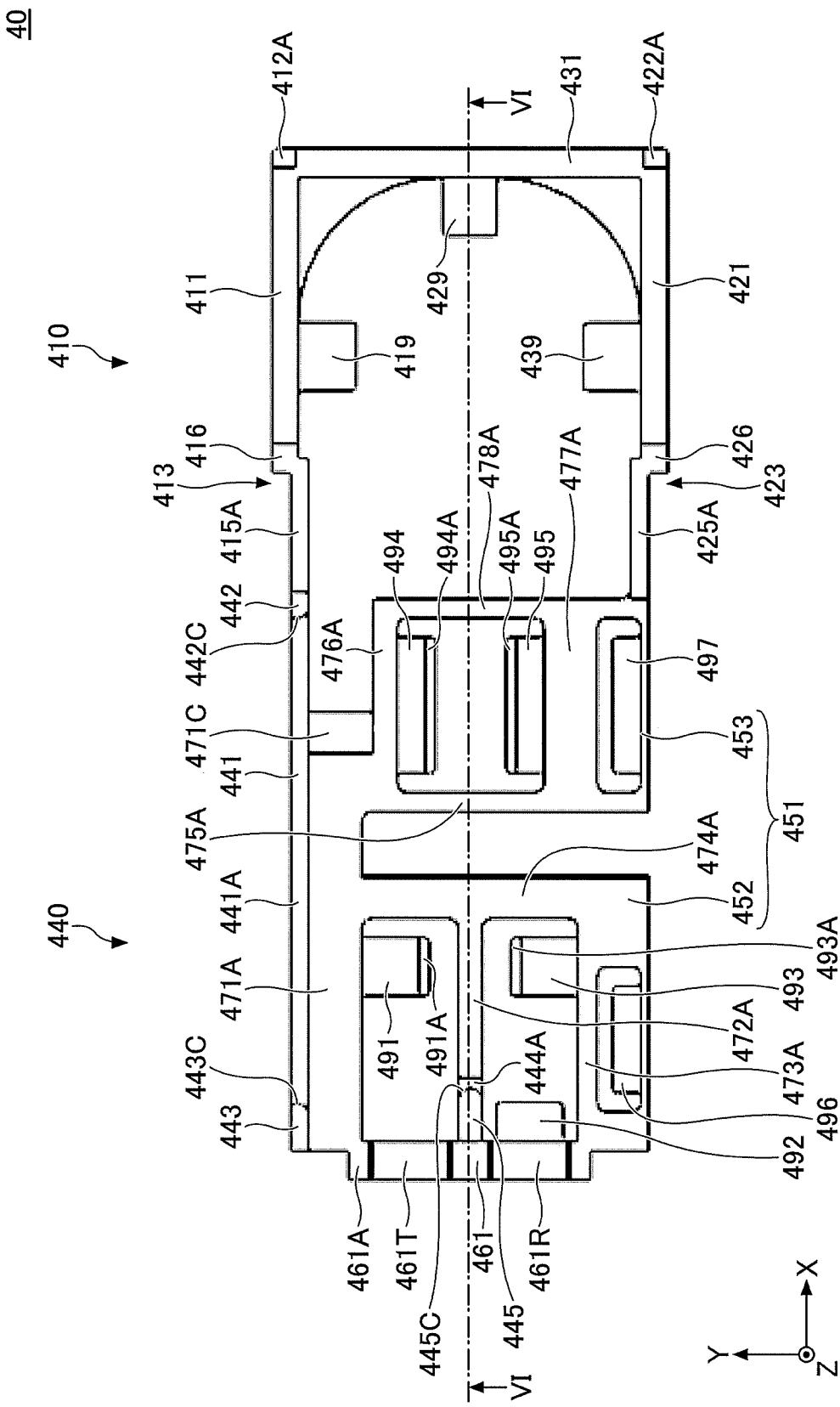
FIG. 4 is a top view illustrating the fiber tray.
Figure 5:
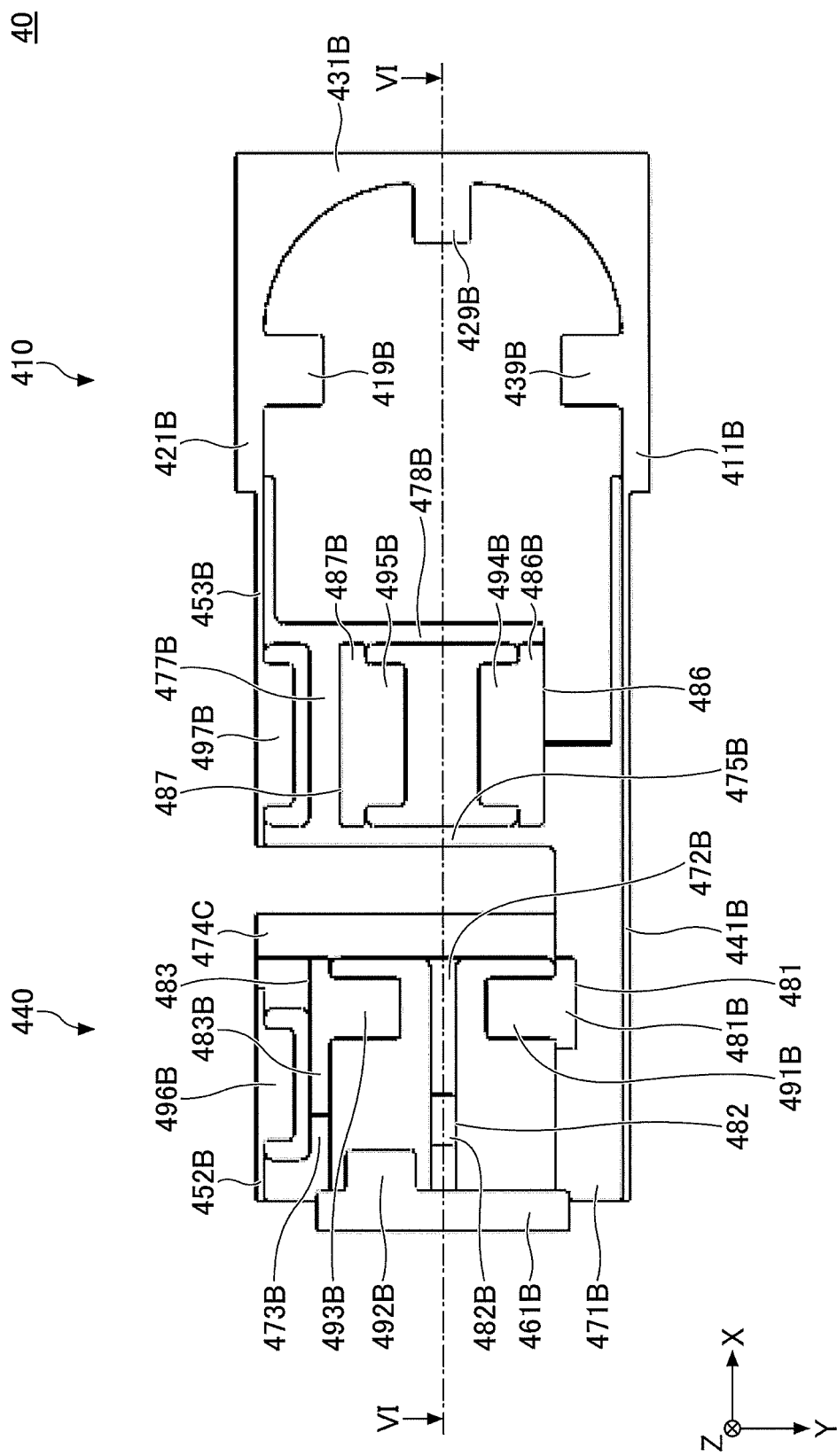
FIG. 5 is a bottom view illustrating the fiber tray.
Figure 6:
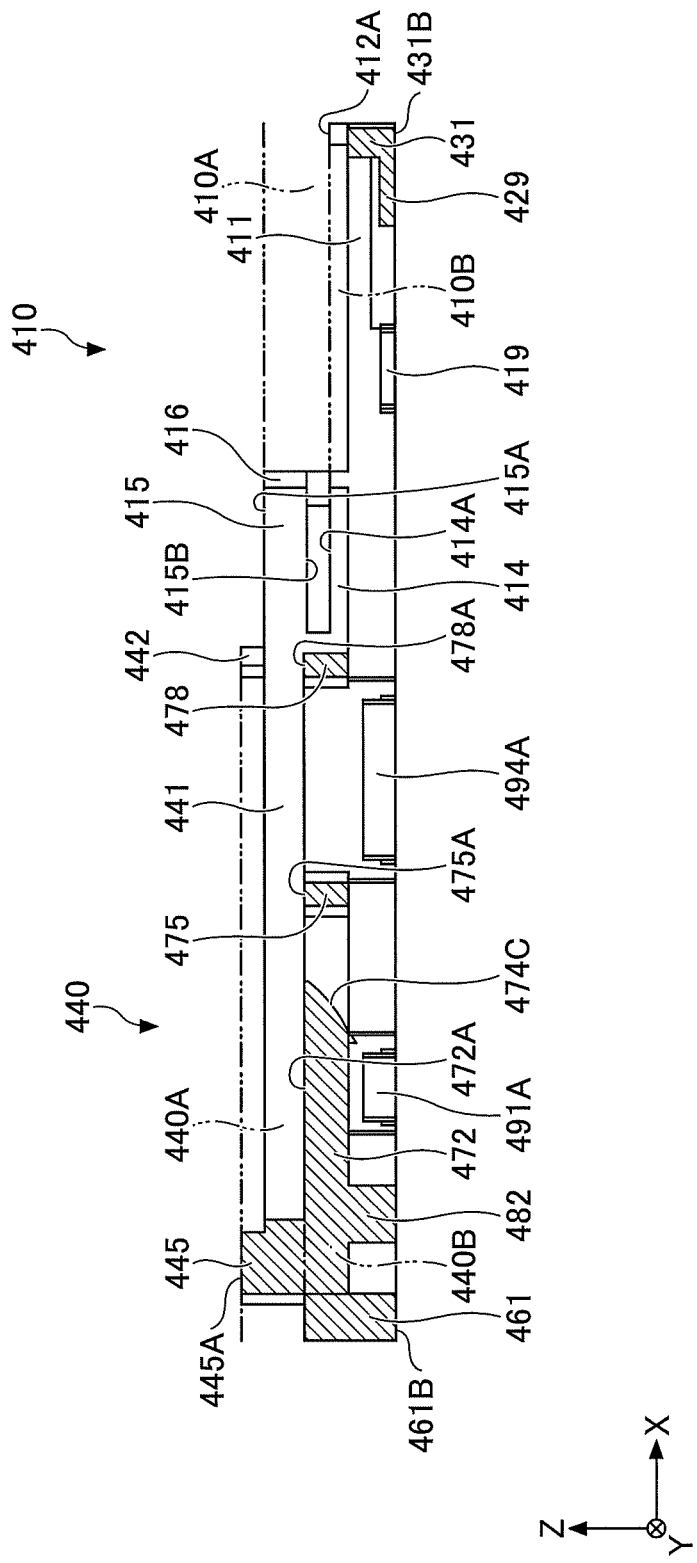
FIG. 6 is a cross-sectional view illustrating the fiber tray.

Next, a configuration of the fiber tray 40 will be described. FIG. 3 is a perspective view of the fiber tray 40. FIG. 4 is a top view of the fiber tray 40. FIG. 5 is a bottom view of the fiber tray 40. FIG. 6 is a cross-sectional view illustrating the fiber tray 40. FIG. 6 corresponds to a cross-sectional view taken along the VI-VI line in FIG. 4 and FIG. 5.

The fiber tray 40 has a rectangular parallelepiped shape that is long in the X axis direction. The fiber tray 40 includes a first support portion 410 that supports the first wiring substrate 10 and a second support portion 440 that supports the second wiring substrate 20. The first support portion 410 is located on the rear side relative to the second support portion 440.

The first support portion 410 includes sidewall portions 411 and 421 extending in the X axis direction and a rear wall portion 431 extending in the Y axis direction. The sidewall portion 411 is provided on the +Y side relative to the sidewall portion 421. The rear wall portion 431 connects the rear side end portion of the sidewall portion 411 and the rear side end portion of the sidewall portion 421.

On the rear side end portion of the sidewall portion 411, a protrusion 412 that rises upward from the upper surface 411A of the sidewall portion 411 is provided. The protrusion 412 has an upper surface 412A that the lower surface 10F (see FIG. 8) of the first wiring substrate 10 contacts. A fixing portion 413 is provided at the front side end portion of the sidewall portion 411 to fix a fitting portion 18C (see FIG. 7 and FIG. 8) of the first wiring substrate 10 by snap-fitting. The fixing portion 413 has a protrusion 414 that rises upward from the upper surface 411A of the sidewall portion 411 and a substrate holding portion 415 that is provided above the protrusion 414. The protrusion 414 and the substrate holding portion 415 are formed so as to extend in the X axis direction so as to sandwich one edge of the first wiring substrate in the lateral direction. The distance between the upper surface 414A of the protrusion 414 and the lower surface 415B of the substrate holding portion 415 is substantially the same as the thickness of the first wiring substrate 10. The lower surface 10F (see FIG. 8) of the first wiring substrate 10 contacts the upper surface 414A. The upper surface 10E (see FIG. 7) of the first wiring substrate 10 may contact the lower surface 415B. The fixing portion 413 further has a pillar portion 416 that extends in the Z axis direction to connect the rear side end portion of the protrusion 414 and the rear side end portion of the substrate holding portion 415. The pillar portion 416 has a side surface 416C on which the fitting portion 18C of the first wiring substrate 10 is hooked.

On the rear side end portion of the sidewall portion 421, a protrusion 422 that rises upward from the upper surface 421A of the sidewall portion 421 is provided. The protrusion 422 has an upper surface 422A that the lower surface 10F of the first wiring substrate 10 (see FIG. 8) contacts. A fixing portion 423 is provided at the front side end portion of the sidewall portion 421 to fix a fitting portion 18D (see FIG. 7 and FIG. 8) of the first wiring substrate 10 by snap-fitting. The fixing portion 423 has a protrusion 424 that rises upward from the upper surface 421A of the sidewall portion 421 and a substrate holding portion 425 that is provided above the protrusion 424. The protrusion 424 and the substrate holding portion 425 are formed so as to extend in the X axis direction so as to sandwich the other edge of the first wiring substrate in the lateral direction. The distance between the upper surface 424A of the protrusion 424 and the lower surface 425B of the substrate holding portion 425 is substantially the same as the thickness of the first wiring substrate 10. The lower surface 10F (see FIG. 8) of the first wiring substrate 10 contacts the upper surface 424A. The upper surface 10E (see FIG. 7) of the first wiring substrate 10 may contact the lower surface 425B. The fixing portion 423 further has a pillar portion 426 that extends in the Z axis direction to connect the rear side end portion of the protrusion 424 and the rear side end portion of the substrate holding portion 425. The pillar portion 426 has a side surface 426C on which the fitting portion 18D of the first wiring substrate 10 is hooked. For example, the distance in the Y axis direction between the pillar portion 416 and the pillar portion 426 is set to be a value less than the dimension of the first wiring substrate 10 in the lateral direction.

A support plate 419 protruding from the bottom portion of the sidewall portion 411 towards the −Y side and to support the internal fibers 31 to 33 of the IC-TROSA 11 is provided. A support plate 439 protruding from the bottom portion of the sidewall portion 421 toward the +Y side to support the internal fibers 31 to 33 of the IC-TROSA 11 is provided. A support plate 429 protruding from the bottom portion of the rear wall portion 431 toward the rear side to support the internal fibers 31 to 33 of the IC-TROSA 11 is provided.

The lower surface 411B of the sidewall portion 411, the lower surface 421B of the sidewall portion 421, the lower surface 431B of the rear wall portion 431, the lower surface 419B of the support plate 419, the lower surface 429B of the support plate 429, and the lower surface 439B of the support plate 439 are flush with each other. It should be noted that the lower surface 411B, the lower surface 421B, and the lower surface 431B may be flush each other, and on a plane different from that, the lower surface 419B, the lower surface 429B, and the lower surface 439B may be flush with each other.

For the first support portion 410, for example, a space 410A that is above (+Z side) the upper surface 412A of the protrusion 412, the upper surface 414A of the protrusion 414, the upper surface 422A of the protrusion 422, and the upper surface 424A of the protrusion 424 and that is below the upper surface 415A of the substrate holding portion 415 and the upper surface 425A of the substrate holding portion 425 is included in the upper portion of the fiber tray 40. Also, for example, a space 410B that is below (−Z side) the upper surface 412A of the protrusion 412, the upper surface 414A of the protrusion 414, and the upper surface 422A of the protrusion 422 and that is above the lower surface 411B of the sidewall portion 411, the lower surface 421B of the sidewall portion 421, and the lower surface 431B of the rear wall portion 431 is included in the lower portion of the fiber tray 40. The upper portion of the fiber tray 40 defines the space 410A and the lower portion of the fiber tray 40 defines the space 410B. In the optical transceiver 1 according to the present embodiment, the upper portion and the lower portion of the fiber tray 40 are separated, for example, by a single plane. It should be noted that the upper portion and the lower portion may be separated by a boundary plane having irregularities in the Z axis direction instead of a single plane.

The second support portion 440 includes sidewall portions 441 and 451 extending in the X axis direction and a front wall portion 461 extending in the Y axis direction. The sidewall portion 441 is provided on the +Y side relative to the sidewall portion 451. The front wall portion 461 connects the front side end portion of the sidewall portion 441 and the front side end portion of the sidewall portion 451. The rear side end portion of the sidewall portion 441 and the front side end portion of the sidewall portion 411 are connected and the rear side end portion of the sidewall portion 451 and the rear side end portion of the sidewall portion 421 are connected. The front wall portion 461 is an example of a first wall portion, the rear wall portion 431 is an example of a second wall portion, the sidewall portion 421 and the sidewall portion 451 are an example of a third wall portion, and the sidewall portion 411 and the sidewall portion 441 are an example of a fourth wall portion.

The sidewall portion 441 has an upper surface 441A that the lower surface 20F of the second wiring substrate 20 (see FIG. 11) contacts. The upper surface 441A is above the lower surface 415B of the substrate holding portion 415 and the lower surface 425B of the substrate holding portion 425.

The upper surface 441A may be flush with the upper surface 415A of the substrate holding portion 415 and the upper surface 425A of the substrate holding portion 425, for example. That is, for example, with a plane (bottom plane) including the lower surface 411B, the lower surface 421B, and the lower surface 431B as a reference, the upper surface 441A may have a height equal to the height of the upper surface 415A and the upper surface 425A. On the rear side end portion of the sidewall portion 441, a protrusion 442 that rises upward from the upper surface 441A is provided. The protrusion 442 has a side surface 442C that contacts a side surface 29A (see FIG. 10 and FIG. 11) of a recessed portion 28A of the second wiring substrate 20. On the front side end portion of the sidewall portion 441, a protrusion 443 that rises upward from the upper surface 441A is provided. The protrusion 443 has a side surface 443C that contacts a side surface 29B (see FIG. 10 FIG. 11) of a recessed portion 28B of the second wiring substrate 20. The lower surface 441B of the sidewall portion 441 is flush with the lower surface 411B and the like.

A rib 471 extending in the X axis direction is provided so as to be connected with the −Y side surface of the sidewall portion 441. The upper surface 471A of the rib 471 is below the upper surface 441A. The lower surface 471B of the rib 471 is above the lower surface 441B of the sidewall portion 441. The side surface 471C on the rear side of the rib 471 is an inclined surface that is inclined downward toward the rear side. That is, the side surface 471C is inclined such that the height from the bottom surface decreases from the front side to the rear side. The inclination angle of the side surface 4710 from the upper surface 441A is, for example, 40° to 50°. For example, this inclination angle is equal to the angle formed by the plane including the upper surface 441A and the plane including the side surface 471C intersecting the upper surface 441A. Under the rib 471, a support pillar 481 that supports the rib 471 is provided. A support plate 491 that protrudes from the bottom portion of the support pillar 481 towards the −Y side and that supports the internal fibers 31 to 33 is provided. On the −Y side end portion of the support plate 491, a return 491A that rises upward and restricts the movement of the internal fibers 31 to 33 in the Y axis direction is provided. The lower surface 481B of the support pillar 481 and the lower surface 491B of the support plate 491 are flush with the lower surface 441B and the like.

The upper surface 461A of the front wall portion 461 is flush with the upper surface 471A. On the front wall portion 461, a recessed portion 461T in which a sleeve 32A connectable to an external connector is fitted and a recessed portion 461R in which a sleeve 33A connectable to an external connector is fitted are formed. The sleeve 32A is provided on the tip of the second internal fiber 32 and the sleeve 33A is provided on the tip of the third internal fiber 33. The recessed portion 461T holds the sleeve 32A and the recessed portion 461R holds the sleeve 33A. The recessed portion 461T and the recessed portion 461R each has a curved surface of a semi-cylindrical inner surface. That is, the recessed portion 461T and the recessed portion 461R each has an R-shaped curved surface. A support plate 492 that protrudes from the bottom portion of the front wall portion 461 toward the rear side and supports the internal fibers 31 to 33 is provided. The support plate 492 is provided, for example, on the rear side of the recessed portion 461R in a plan view. The lower surface 461B of the front wall portion 461 and the lower surface 492B of the support plate 492 are flush with the lower surface 441B and the like. The sleeve 32A is an example of a first sleeve and the sleeve 33A is an example of a second sleeve. The recessed portion 461T is an example of a first holding portion and the recessed portion 461R is an example of a second holding portion.

A rib 472 extending from the portion between the recessed portion 461T and the recessed portion 461R of the front wall portion 461 to the rear side is provided. The upper surface 472A of the rib 472 is flush with the upper surface 471A and the like. The lower surface 472B of the rib 472 is flush with the lower surface 471B. On the front side end portion of the rib 472, a protrusion 444 that rises upward from the upper surface 472A is provided. The protrusion 444 has an upper surface 444A that the lower surface 20F of the second wiring substrate 20 (see FIG. 11) contacts. Further, a protrusion 445 that rises upward from the upper surface 444A of the protrusion 444 is provided. The protrusion 445 has a side surface 445C that contacts a side surface 29C of a recessed portion 28C of the second wiring substrate 20 (see FIG. 10 and FIG. 11). Under the rib 472, a support pillar 482 that supports the rib 472 is provided. The lower surface 482B of the support pillar 482 is flush with the lower surface 441B and the like.

A rib 473 extending from a −Y side portion of the recessed portion 461R of the front wall portion 461 to the rear side is provided. The upper surface 473A of the rib 473 is flush with the upper surface 471A and the like. The lower surface 473B of the rib 473 is flush with the lower surface 471B and the like. Under the rib 473, a support pillar 483 that supports the rib 473 is provided. A support plate 493 that protrudes from the bottom portion of the support pillar 483 toward the +Y side and supports the third internal fiber 33 is provided. On the +Y side end portion of the support plate 493, a return 493A that rises upward and restricts the movement of the third internal fiber 33 in the Y axis direction is provided. The lower surface 483B of the support pillar 483 and the lower surface 493B of the support plate 493 are flush with the lower surface 441B and the like.

A rib 474 is provided that extends in the Y axis direction between the rib 471 and the sidewall portion 451. The rear side end portions of the rib 472 and 473 are connected to the rib 474. The upper surface 474A of the rib 474 is flush with the upper surface 471A and the like. The side surface 474C on the rear side of the rib 474 is an inclined surface that is inclined downward toward the front side. That is, the side surface 474C is inclined such that the height from the lower surface decreases from the rear side to the front side. The lower end of the side surface 474C is connected to the lower surfaces 472B and 473B. The inclination angle of the side surface 474C from the lower surfaces 472B and 473B is, for example, 40° to 50°. For example, this inclination is equal to the angle formed by the plane including the lower surfaces 472B and 473B and the plane including the side surface 474C intersecting the plane including the lower surfaces 472B and 473B.

A rib 475 extending in the Y axis direction between the rib 471 and the sidewall portion 451 is provided on the rear side relative to the rib 474. The upper surface 475A of the rib 475 is flush with the upper surface 471A. The lower surface 475B of the rib 475 is flush with the lower surface 471B.

A rib 476 extending from a portion of the rib 475 connected to the rib 471 to the rear side is provided. The upper surface 476A of the rib 476 is flush with the upper surface 471A and the like. Under the rib 476, a support pillar 486 that supports the rib 476 is provided. A support plate 494 that protrudes from the bottom portion of the support pillar 486 towards the −Y side and supports the second internal fiber 32 is provided. On the −Y side end portion of the support plate 494, a return 494A that rises upward and restricts the movement of the second internal fiber 32 in the Y axis direction is provided. The lower surface 486B of the support pillar 486 and the lower surface 494B of the support plate 494 are flush with the lower surface 441B of the sidewall portion 441 and the like.

A rib 477 extending from a portion of the rib 475 between the rib 471 and the sidewall portion 451 to the rear side is provided. The upper surface 477A of the rib 477 is flush with the upper surface 471A and the like. The lower surface 477B of the rib 477 is flush with the lower surface 471B and the like. Under the rib 477, a support pillar 487 that supports the rib 477 is provided. A support plate 495 that protrudes from the bottom portion of the support pillar 487 toward the +Y side and supports the third internal fiber 33 is provided. On the +Y side end portion of the support plate 495, a return 495A that rises upward and restricts the movement of the third internal fiber 33 in the Y axis direction is provided. The lower surface 487B of the support pillar 487 and the lower surface 495B of the support plate 495 are flush with the lower surface 441B and the like.

A rib 478 extending in the Y axis direction between the rib 471 and the sidewall portion 451 is provided on the rear side relative to the rib 475. The rear side end portions of the ribs 476 and 477 are connected to the rib 478. The upper surface 478A of the rib 478 is flush with the upper surface 471A. The lower surface 478B of the rib 478 is flush with the lower surface 471B.

The sidewall portion 451 has a front portion 452 connected to the rib 474 and the front wall portion 461, and a rear portion 453 connected to the rib 475 and the sidewall portion 421. The front portion 452 and the rear portion 453 are away from each other. The front portion 452 is provided on the front side relative to the rear portion 453. A support plate 496 that protrudes from the bottom portion of the front portion 452 toward the +Y side and supports the internal fibers 31 to 33 is provided. A support plate 497 that protrudes from the bottom portion of the rear portion 453 toward the +Y side and supports the internal fibers 31 to 33 is provided. The lower surface 452B of the front portion 452, the lower surface 453B of the rear portion 453, the lower surface 496B of the support plate 496, and the lower surface 497B of the support plate 497 are flush with the lower surface 441B and the like.

For the second support portion 440, for example, a space 440A that is above (+Z side) the upper surfaces 471A to 478A of the ribs 471 to 478 and that is below the upper surface 445A of the protrusion 445 is included in the upper portion of the fiber tray 40. Also, for example, a space 440B that is below (−Z side) the upper surfaces 471A to 478A of the ribs 471 to 478 and that is above the lower surface 441B of the sidewall portion 441, the lower surface 452B of the front portion 452, and the lower surface 453B of the rear portion 453, and the lower surface 461B of the front wall portion 461 is included in the lower portion of the fiber tray 40. The upper portion of the fiber tray 40 defines the space 440A and the lower portion of the fiber tray 40 defines the space 440B.

Figure 7:
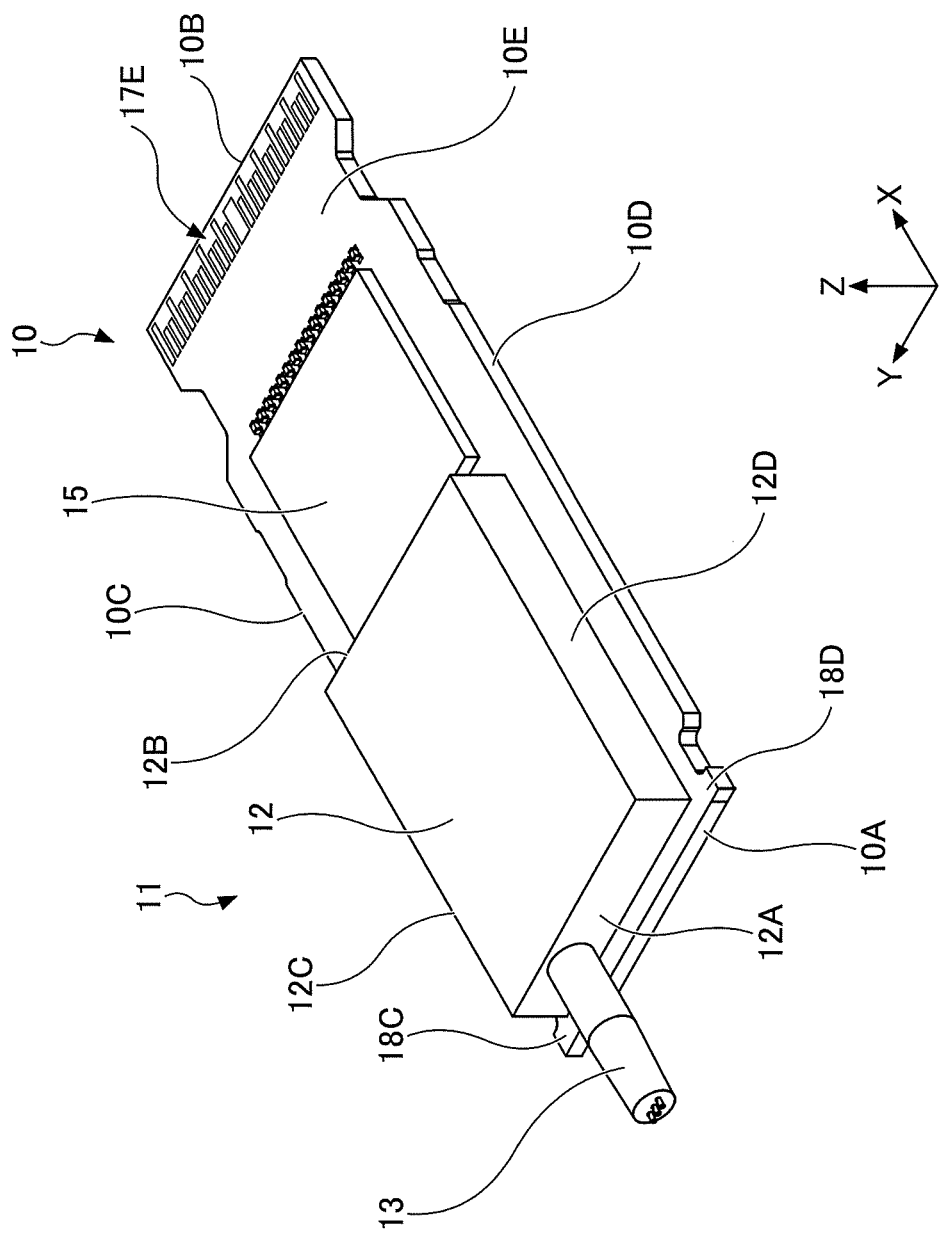
FIG. 7 is a perspective view illustrating a first wiring substrate and components attached to the first wiring substrate.
Figure 8:
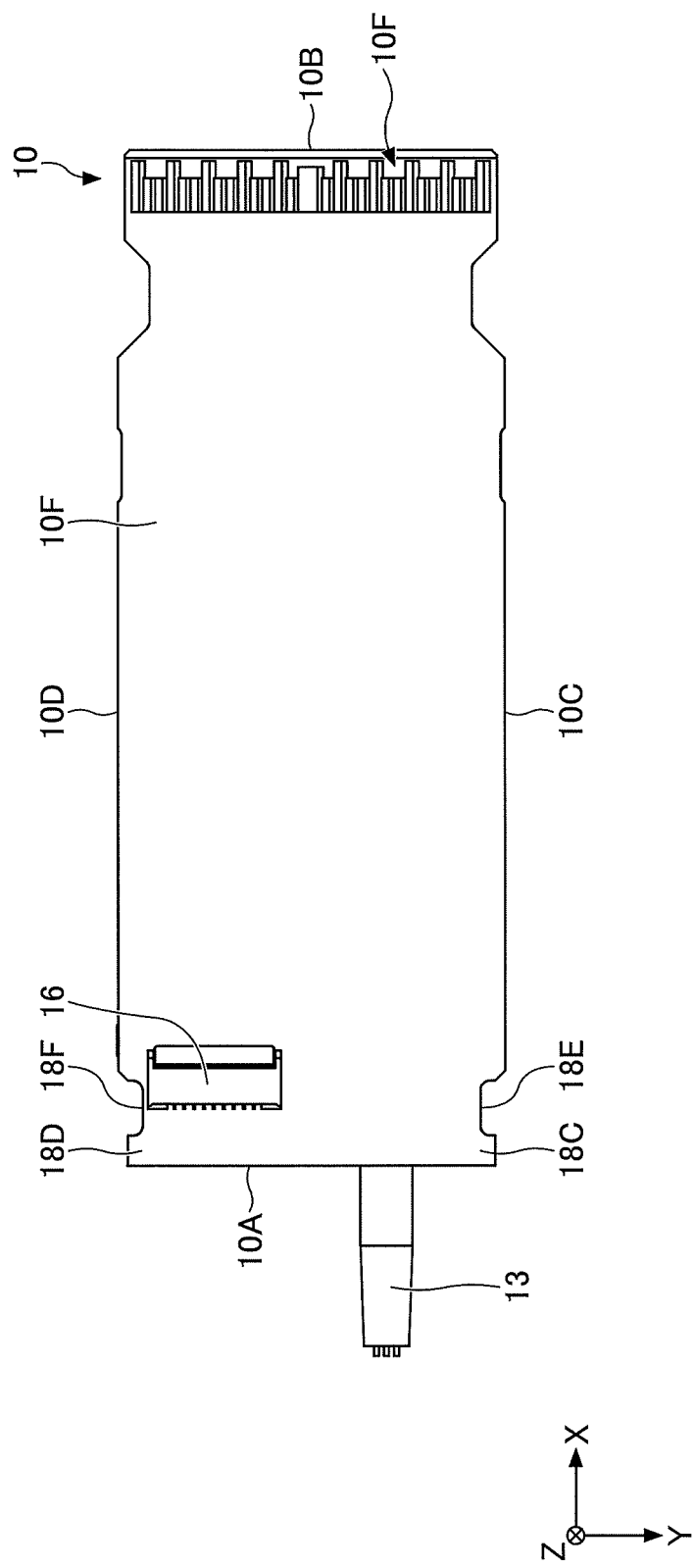
FIG. 8 is a bottom view illustrating the first wiring substrate and components attached to the first wiring substrate.

Next, a configuration of the first wiring substrate 10 will be described. FIG. 7 is a perspective view illustrating the first wiring substrate 10 and components attached to the first wiring substrate 10. FIG. 8 is a bottom view illustrating the first wiring substrate 10 and components attached to the first wiring substrate 10.

The first wiring substrate 10 has a planar shape having a longitudinal direction in the X axis direction and a lateral direction in the Y axis direction. That is, the first wiring substrate 10 has a rectangular shape that is long in the X axis direction. The first wiring substrate 10 has a side surface 10A, a side surface 10B, a side surface 10C, a side surface 10D, an upper surface 10E, and a lower surface 10F. The side surfaces 10A and 10B are planes perpendicular to the X axis direction and the side surface 10B is provided on the +X side (rear side) relative to the side surface 10A. The side surfaces 10C and 10D are planes perpendicular to the Y axis direction and the side surface 10C is provided on the +Y side relative to the side surface 10D. The upper surface 10E is an example of a second surface.

The side surface 10C of the first wiring substrate 10 has a recessed portion 18E recessed toward the −Y side and a fitting portion 18C protruding toward the +Y side with respect to the recessed portion 18E. The side surface 10D of the first wiring substrate 10 has a recessed portion 18F recessed toward the +Y side and a fitting portion 18D protruding toward the −Y side with respect to the recessed portion 18F. The fitting portions 18C and 18D are provided on the front side end portion of the first wiring substrate 10. As described above, the fitting portion 18C is fixed to the fixing portion 413 of the sidewall portion 411 by snap-fitting, and the fitting portion 18D is fixed to the fixing portion 423 of the sidewall portion 421 by snap-fitting.

The IC-TROSA 11 and the DSP 15 are provided on the upper surface 10E of the first wiring substrate 10. A connector 16 is provided on the lower surface 10F of the first wiring substrate 10. One end of the FPC 50 is connected to the connector 16. A terminal group 17E including a plurality of external terminals is provided on the rear side end portion of the upper surface 10E, and a terminal group 17F including a plurality of external terminals is provided on the rear side end portion of the lower surface 10F. When the optical transceiver 1 is inserted into a cage of a host system, the terminal groups 17E and 17F are connected to a plurality of terminals provided on the cage. For example, the terminal groups 17E and 17F constitute an electric plug and are fitted with an electric socket constituted by the plurality of terminals provided on the cage. When fitted, predetermined terminals of the terminal groups 17E and 17F and a plurality of predetermined terminals of the plurality of terminals provided on the cage are electrically connected one-to-one.

Figure 9:
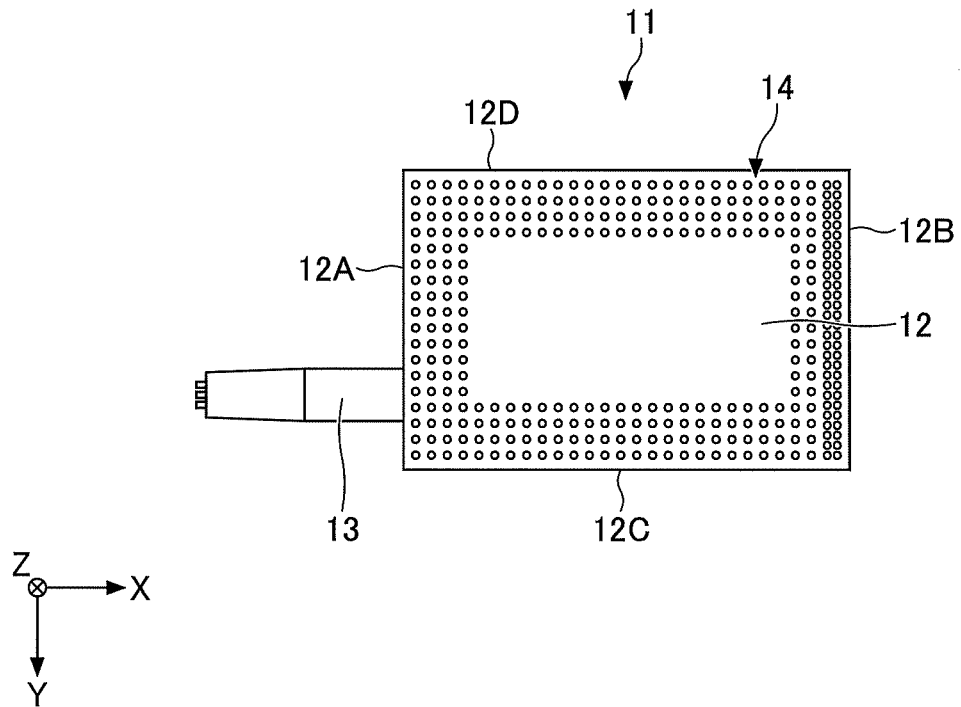
FIG. 9 is a bottom view illustrating an IC-TROSA.

FIG. 9 is a bottom view illustrating the IC-TROSA 11. There are two types that are type 1 and type 2 for IC-TROSA 11 depending on the difference in external shape, and FIG. 9 illustrates type 1. The IC-TROSA 11 includes an optical circuit element and a package 12 that houses the optical circuit element. The package 12 has a rectangular parallelepiped shape and has a longitudinal direction along the X axis direction and a lateral direction along the Y axis direction. The package 12 has a side surface 12A, a side surface 12B, a side surface 12C and a side surface 12D. The side surface 12A and 12B are planes perpendicular to the X axis direction and the side surface 12B is provided on the +X side (rear side) relative to the side surface 12A. The side surfaces 12C and 12D are planes perpendicular to the Y axis direction, and the side surface 12C is provided on the +Y side relative to the side surface 12D. That is, the side surface 12A is a surface provided on the side opposite to the cage of the host system in the X axis direction, and is an example of a first surface. On the lower surface of the package 12, as illustrated in FIG. 9, a terminal group 14 including a plurality of external terminals that connect the optical circuit element and the first wiring substrate 10 is provided. The terminal group 14 constitutes, for example, a ball grid array (BGA). For example, the dimension of the package 12 in the X axis direction is 22.5 mm, the dimension of the package 12 in the Y axis direction is 15 mm, and the dimension of the package 12 in the Z axis direction is 3.3 mm.

The IC-TROSA 11 further includes a first internal fiber 31 for reference light connected to the optical circuit element, a second internal fiber 32 for transmitted light, and a third internal fiber 33 for received light, and a boot 13 that bundles the internal fibers 31 to 33. The first internal fiber 31 is, for example, a polarization maintaining fiber. The first internal fiber 31 and the third internal fiber 33 input light from the outside to the IC-TROSA 11, and the second internal fiber 32 outputs light from the IC-TROSA 11 to the outside. The light input through the first internal fiber 31 is divided into two portions for transmission and reception inside the IC-TROSA 11. The internal fibers 31 to 33 extend from the side surface 12A to the −X side in proximity to each other, and the boot 13 also extends from the side surface 12A to the −X side. For example, the dimension of the boot 3 in the X axis direction is 10 mm. As illustrated in FIG. 2, an optical connector 31A is provided on the tip of the first internal fiber 31. The sleeve 32A is provided on the tip of the second internal fiber 32. The sleeve 33A is provided on the tip of the third internal fiber 33.

The DSP 15 is arranged on the rear side relative to the IC-TROSA 11. The DSP 15 is electrically connected to the IC-TROSA 11 and the terminal group 17E through wiring formed in the first wiring substrate 10. The DSP 15 processes an electrical signal related to photoelectric conversion performed by the IC-TROSA 11. The DSP 15 is, for example, a digital signal processing IC.

The optical circuit element generates transmitted light by modulating light divided for transmission from reference light according to an electric signal. The transmitted light is output through the second internal fiber 32. The optical circuit element causes received light, input through the third internal fiber 33, to optically interfere with light divided for reception from the reference light.

Figure 10:
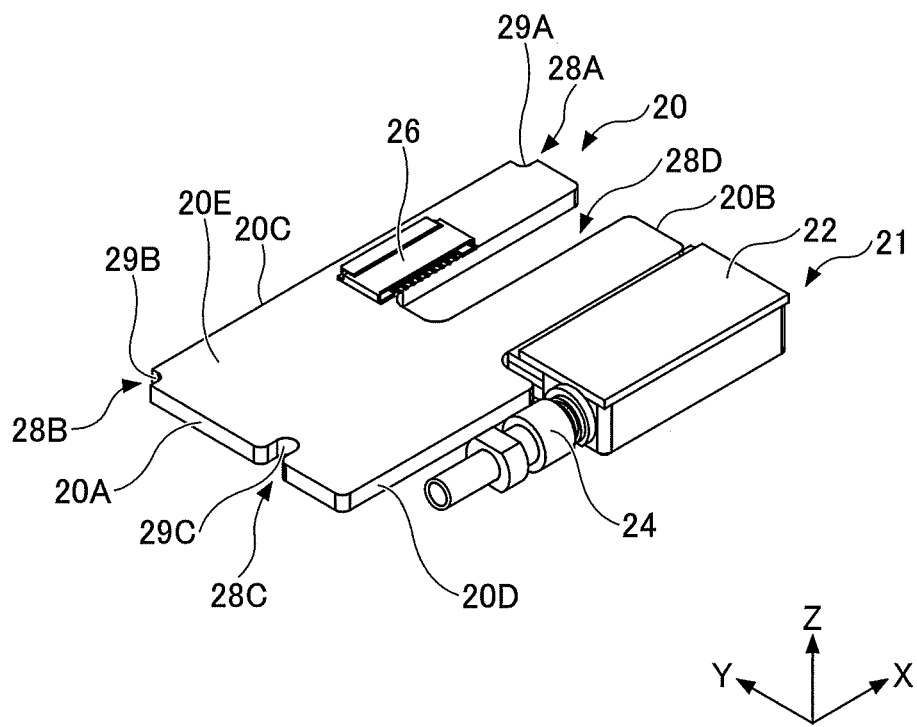
FIG. 10 is a perspective view illustrating a second wiring substrate and components attached to the second wiring substrate.
Figure 11:
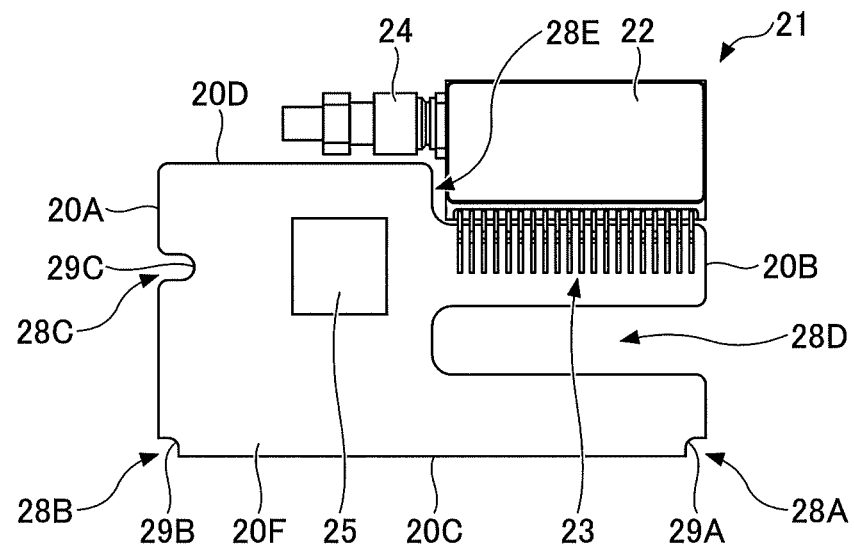
FIG. 11 is a bottom view illustrating the second wiring substrate and components attached to the second wiring substrate.
Figure 11:
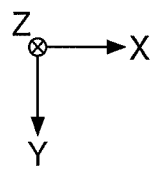

Next, a configuration of the second wiring substrate 20 will be described. FIG. 10 is a perspective view illustrating the second wiring substrate 20 and components attached to the second wiring substrate 20. FIG. 11 is a bottom view illustrating the second wiring substrate 20 and components attached to the second wiring substrate 20.

The second wiring substrate 20 has a side surface 20A, a side surface 20B, a side surface 20C, a side surface 20D, an upper surface 20E, and a lower surface 20F. The side surfaces 20A and 20B are planes perpendicular to the X axis direction and the side surface 20B is provided on the +X side (rear side) relative to the side surface 20A. The side surfaces 20C and 20D are planes perpendicular to the Y-axis direction, and the side surface 20C is provided on the +Y side relative to the side surface 20D. For example, the dimension of the second wiring substrate 20 in the X axis direction is 27 mm and the dimension of the second wiring substrate 20 in the Y axis direction is 14.35 mm. The upper surface 20E is an example of a third surface.

At the corner portion where the side surface 20B and the side surface 20C intersect, a recessed portion 28A into which the protrusion 442 of the fiber tray 40 enters is formed. The recessed portion 28A has a side surface 29A having an arc shape in a plan view that the side surface 442C of the protrusion 442 follows. At the corner portion where the side surface 20A and the side surface 20C intersect, a recessed portion 28B into which the protrusion 443 of the fiber tray 40 enters is formed. The recessed portion 28B has a side surface 29B having an arc shape in a plan view that the side surface 443C of the protrusion 443 follows. On the side surface 20A, a recessed portion 28C into which the protrusion 445 of the fiber tray 40 enters is formed. The recessed portion 28C has a side surface 29C having an arc shape in a plan view that the side surface 445C of the protrusion 445 follows.

On the side surface 20B, a recessed portion 28D into which the boot 13 of the IC-TROSA 11 enters is formed. The internal fibers 31 to 33 bundled by the boot 13 are housed in the lower portion of fiber tray 40 through the recessed portion 28D. The dimension of the recessed portion 28D in the Y axis direction is larger than the diameter of the boot 13, and the dimension of the recessed portion 28D in the X axis direction is larger than the length of the boot 13 (the dimension of the boot 13 in the X axis direction), and is about half the dimension of the second wiring substrate 20 in the longitudinal direction. The side surface 20B is an example of a fourth surface and the recessed portion 28D is an example of a cutout.

On the side surface 20D, a recessed portion 28E is formed into which the light source module 21, which outputs reference light, enters. The recessed portion 28E extends in the X axis direction and the rear side end portion of the recessed portion 28E reaches the side surface 20B. For example, the dimension of the recessed portion 28E in the X axis direction is approximately the same as the dimension of the recessed portion 28D in the X axis direction and is approximately half the dimension of the second wiring substrate 20 in the longitudinal direction.

The light source module 21 includes a package 22 housing a light source, a terminal group 23 including a plurality of external terminals, and an output port 24 that outputs reference light to the front side. The terminal group 23 is used to supply electric power and input/output electrical signals necessary for operation and control of the light source. In the Y axis direction, the light source module 21 and the boot 13 of the IC-TROSA 11 are arranged in line. For example, the dimension of the package 22 in the X axis direction is 12.8 mm, the dimension of the package 22 in the Y axis direction is 6 mm, and the dimension of the package 22 in the Z axis direction is 3.45 mm. The plurality of external terminals included in the terminal group 23 are arranged in the X axis direction.

A connector 26 is provided on the upper surface 20E of the second wiring substrate 20. The other end of the FPC 50 is connected to the connector 26. The terminal group 23 of the light source module 21 is connected to the lower surface 20F of the second wiring substrate 20. The light source control circuit 25 is mounted on the lower surface 20F of the second wiring substrate 20. The light source control circuit 25 is electrically connected to the terminal group 23 of the light source module 21 through wiring formed in the second wiring substrate 20. The light source control circuit 25 controls the operation of the light source module 21. The distance between the side surface of the light source module 21 on the −Y side and the side surface 100 of the second wiring substrate 20 is substantially the same as the dimension of the fiber tray in the Y axis direction, and is, for example, 18.4 mm.

The first wiring substrate 10 is supported by the first support portion 410 of the fiber tray 40. The lower surface 10F of the first wiring substrate 10 contacts the upper surface 412A of the protrusion 412, the upper surface 414A of the protrusion 414, the upper surface 422A of the protrusion 422, and the upper surface 424A of the protrusion 424. The fitting portion 18C of the first wiring substrate 10 is fixed to the fixing portion 413, and the fitting portion 18D is fixed to the fixing portion 423. Thus, the first wiring substrate 10 is mounted in the upper portion of the fiber tray 40 such that the lower surface 10F, which is the opposite side of (the back surface) of the upper surface 10E, faces the lower portion of the fiber tray 40. The IC-TROSA 11 and DSP 15 mounted on the plane of the upper surface 10E face posed to the downward inner surface of the upper housing 91B.

The second wiring substrate 20 is supported by the second support portion 440 of the fiber tray 40. The lower surface 20F of the second wiring substrate 20 contacts the upper surface 441A of the sidewall portion 441 and the upper surface 444A of the protrusion 444. The side surface 29A of the recessed portion 28A of the second wiring substrate 20 follows the side surface 442C of the protrusion 442, the side surface 29B of the recessed portion 28B follows the side surface 443C of the protrusion 443, and the side surface 29C of the recessed portion 28C follows the side surface 445C of the protrusion 445. Thus, the second wiring substrate 20 is mounted in the upper portion of the fiber tray 40 such that the lower surface 20F, which is the opposite side (the back surface) of the upper surface 20E, faces the lower portion of the fiber tray 40. That is, the upper surface 20E of the second wiring substrate 20 is mounted in the upper portion of the fiber tray 40 in the same orientation as the upper surface 10E of the first wiring substrate 10. The second support portion 440 is provided between the sleeve 32A and the sleeve 33A and the first support portion 410 in the X axis direction (longitudinal direction). Thus, the second wiring substrate 20 is arranged between sleeves 32A and 33A and the first wiring substrate 10 in the X axis direction.

The upper surface 441A of the sidewall portion 441 and the upper surface 444A of the protrusion 444 are above the upper surface 412A of the protrusion 412, the upper surface 414A of the protrusion 414, the upper surface 422A of the protrusion 422, and the upper surface 424A of the protrusion 424. Therefore, in the Z axis direction, the second wiring substrate 20 is provided above the first wiring substrate 10. That is, for example, with the plane (bottom plane) including, the lower surface 411B, the lower surface 421B, and the lower surface 431B as a reference, the height of the second wiring substrate 20 is set to be higher than the height of the first wiring substrate 10 of the fiber tray 40.

Figure 12:
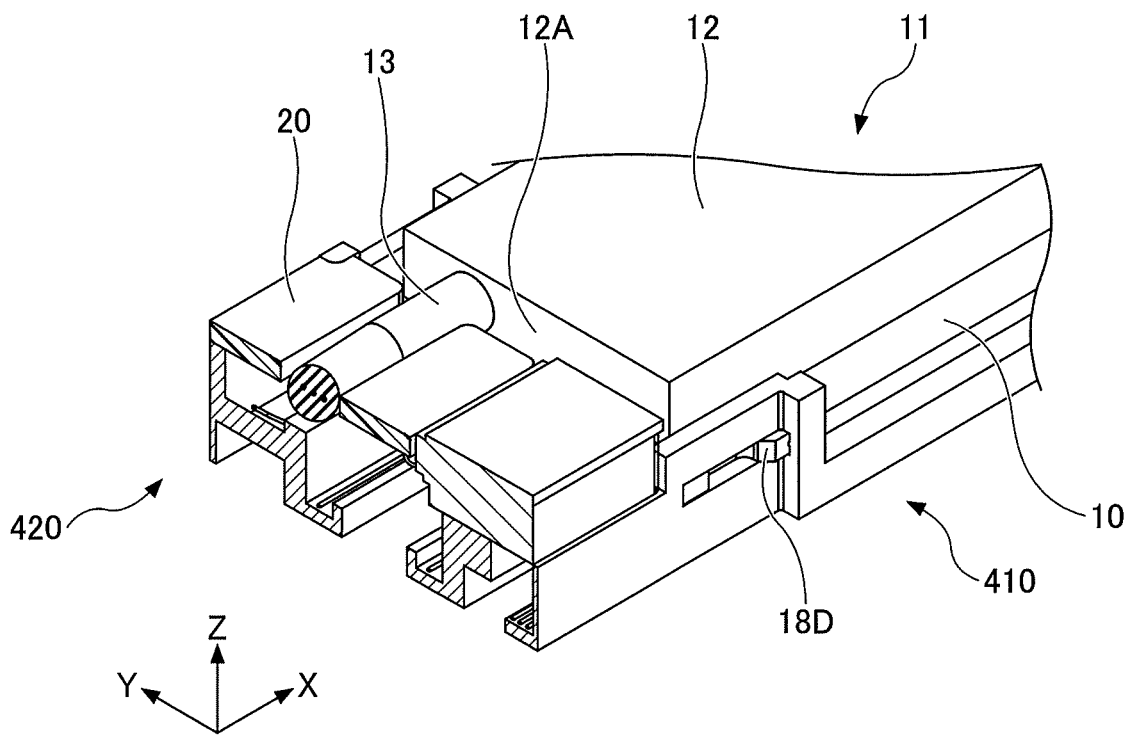
FIG. 12 is a perspective cross-sectional view illustrating a positional relationship between the IC-TROSA and the second wiring substrate.

FIG. 12 is a perspective cross-sectional view illustrating a positional relationship between the IC-TROSA 11 and the second wiring substrate 20. The IC-TROSA is provided on the upper surface 10E of the first wiring substrate 10, and the boot 13 of the IC-TROSA 11 extends forward from the side surface 12A of the package 12. The internal fibers 31 to 33 extend from the front side end portion of boot 13 to the front side. The position of the boot 13 in the Z axis direction is approximately the same as the position of the second wiring substrate 20 in the Z axis direction. Therefore, the position of the internal fibers 31 to 33 in the Z axis direction is also substantially the same as the position of the second wiring substrate 20 in the Z axis direction. Because the recessed portion 28D is formed on the second wiring substrate 20, the boot 13 is located inside the recessed portion 28D and does not contact the second wiring substrate 20, as illustrated in FIG. 12. The boot 13 is located above the ribs 471 to 478.

Figure 13:
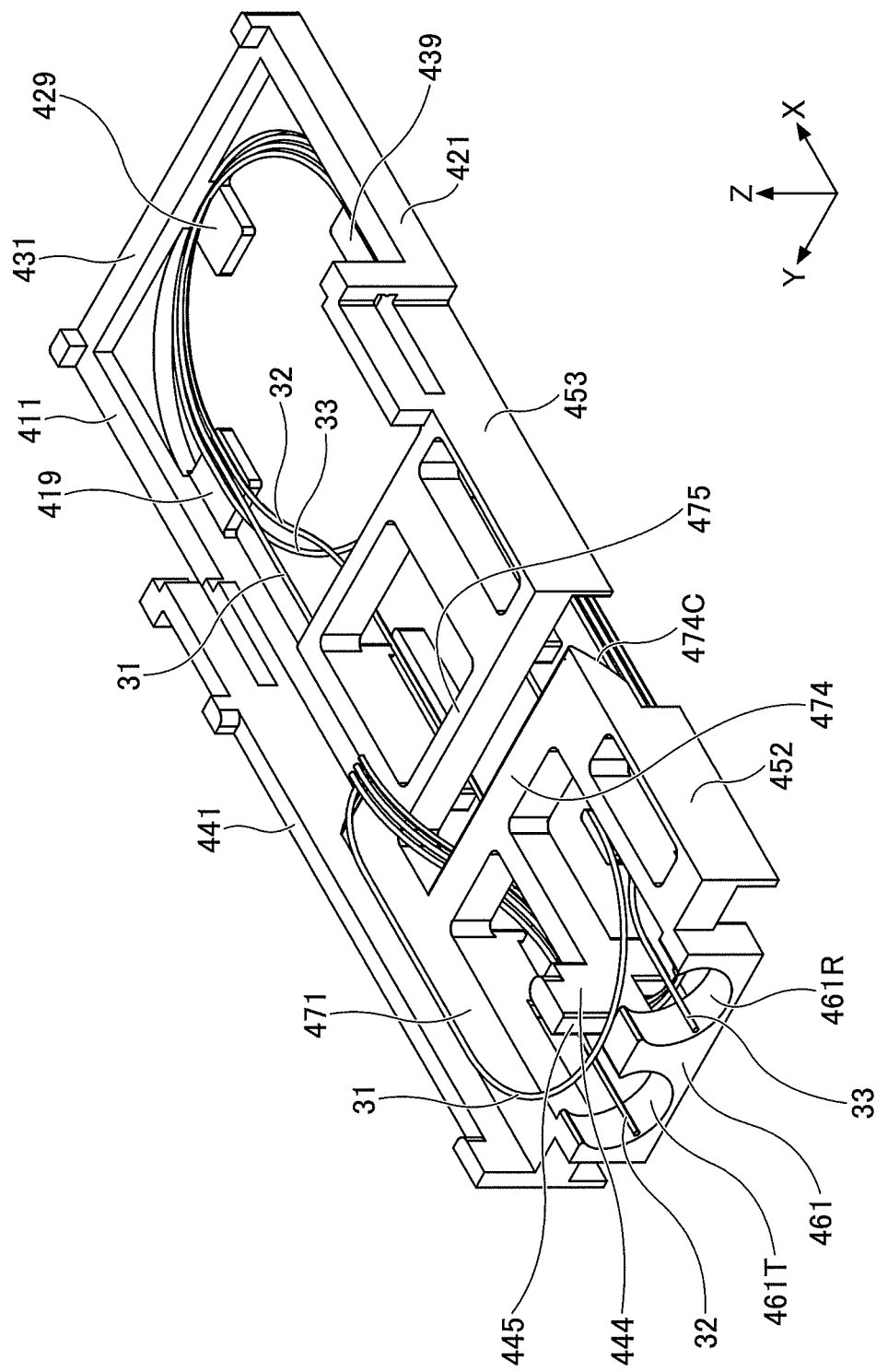
FIG. 13 is a perspective view illustrating the positional relationship between the fiber tray and internal fibers.
Figure 14:
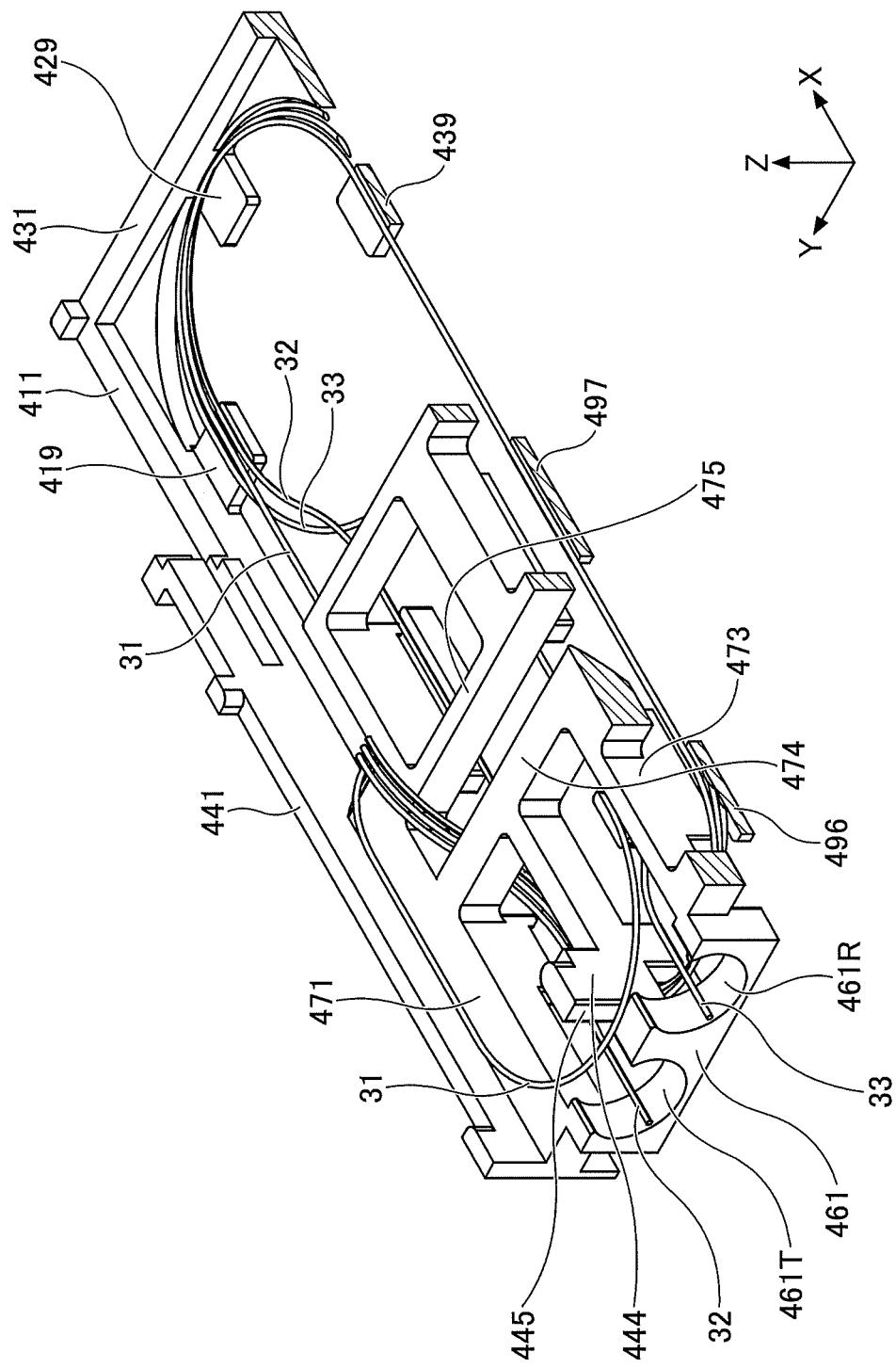
FIG. 14 is a cross-sectional view (part 1) illustrating the positional relationship between the fiber tray and the internal fibers.
Figure 15:
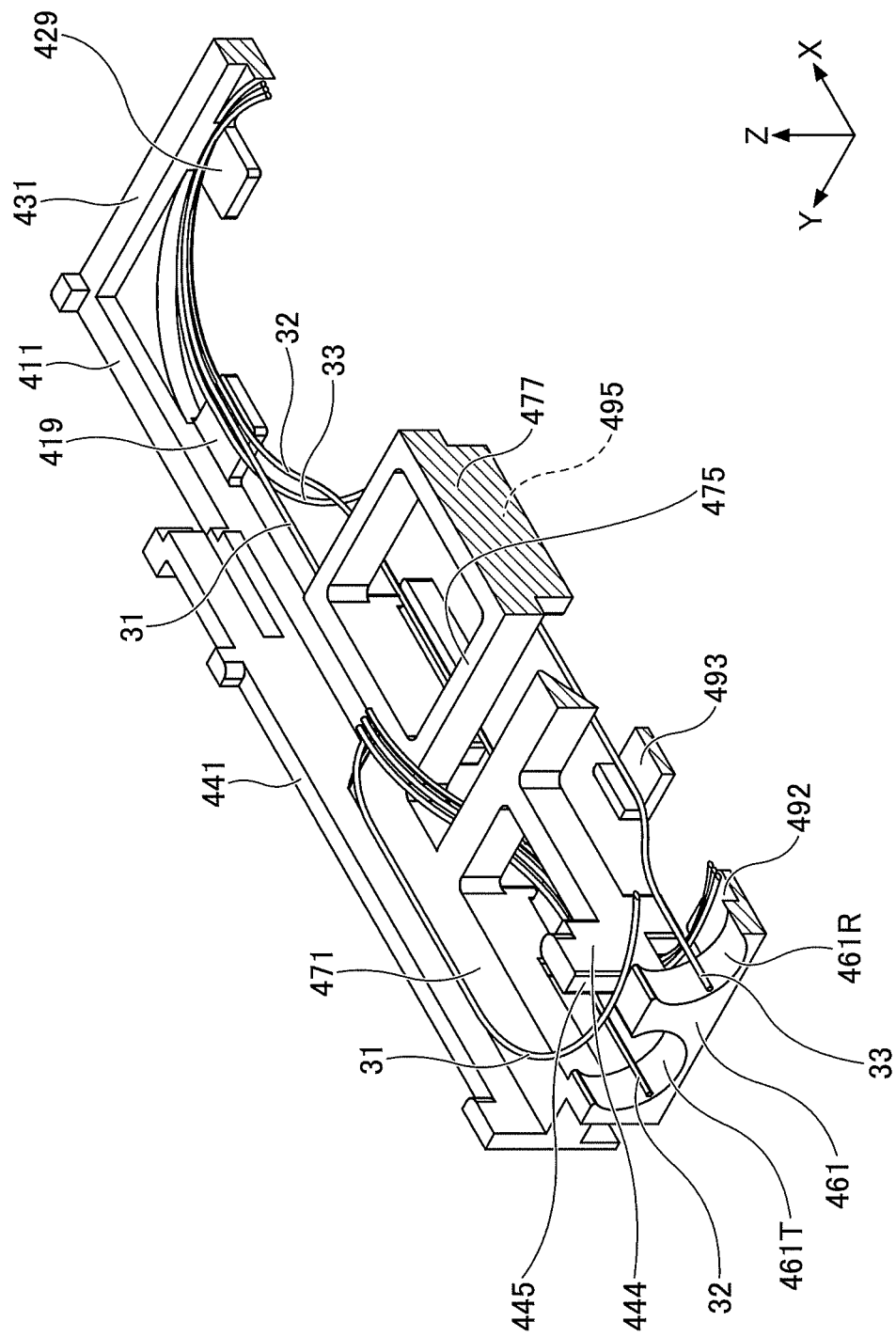
FIG. 15 is a cross-sectional view (part 2) illustrating the positional relationship between the fiber tray and the internal fibers.
Figure 16:
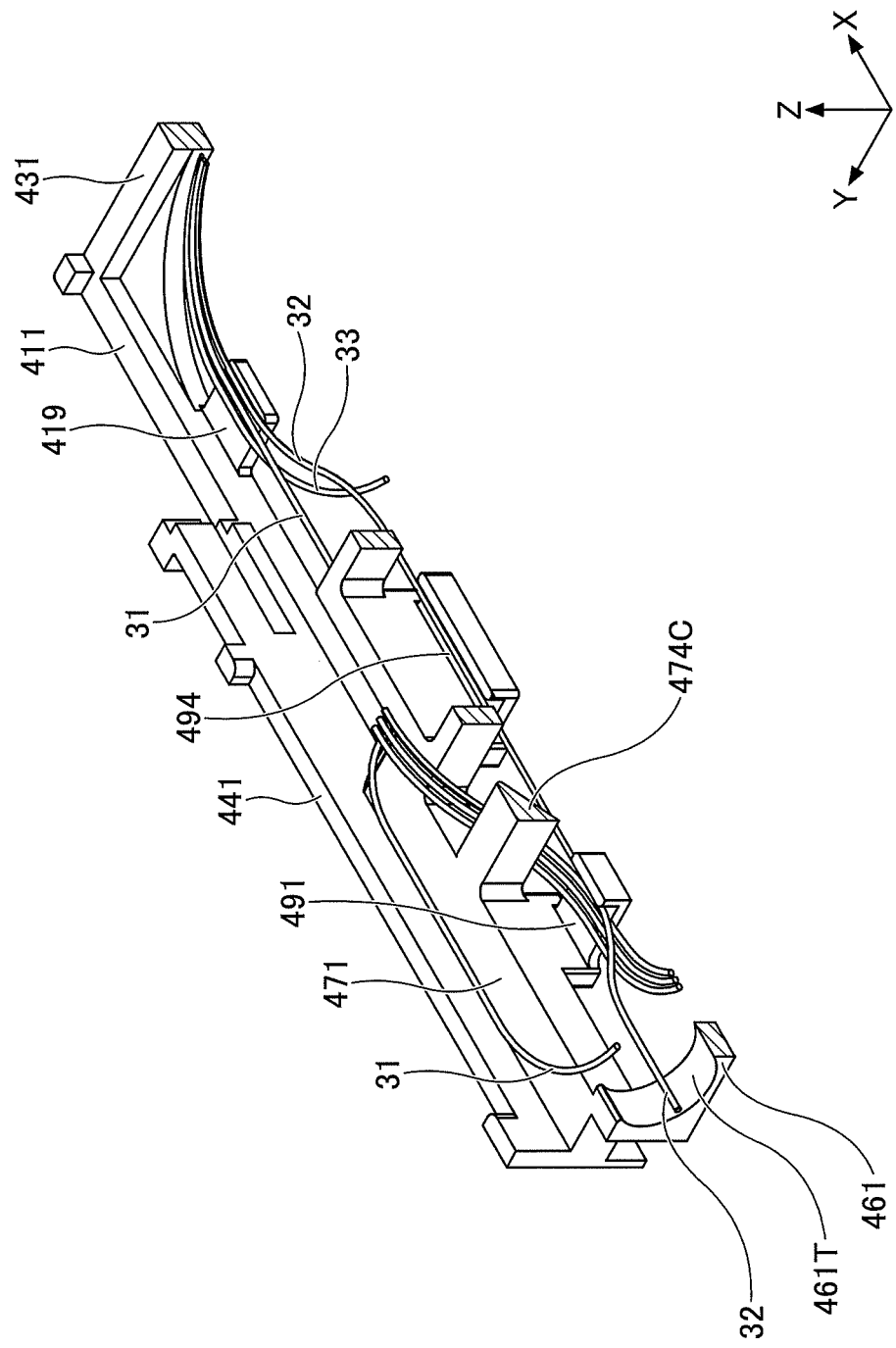
FIG. 16 is a cross-sectional view (part 3) illustrating the positional relationship between the fiber tray and the internal fibers.

Next, housing the internal fibers 31 to 33 in the fiber tray 40 will be described. FIG. 13 is a perspective view illustrating a positional relationship between the fiber tray 40 and the internal fibers 31 to 33. FIG. 14 to FIG. 16 are perspective cross-sectional views illustrating the positional relationship between the fiber tray 40 and the internal fibers 31 to 33. The cross-sections of FIGS. 14-16 illustrate cross-sections when the fiber tray 40 is cut along a plane perpendicular to the Y axis direction.

The internal fibers 31 to 33 extending from the front side end portion of the boot 13 to the front side pass through a gap between the rib 474 and the rib 475, follow the side surface 474C, which is an inclined surface, of the rib 474, and are guided to below the rib 474. The rib 474 is an example of a guide portion. The internal fibers 31 to 33 guided below the rib 474 have, for example, at least a single loop. For example, the internal fibers 31 to 33 extending from the boot 13 to the front side are folded back on the rear side of the front wall portion 461 to extend the rear side to draw a semicircle. Then, the folded internal fibers 31 to 33 extend along the sidewall portion 451 to the rear side, and are folded back on the front side of the rear wall portion 431 to extend to the front side to draw a semicircle. The internal fibers 31 to 33 have a length of, for example, 120 mm to 130 mm.

The internal fibers 31 to 33 guided below the rib 474 are wired to the front wall portion 461, rotated by 180° along the inner surface of the fiber tray 40 over the support plate 492 to draw a semicircle, and then wired to the front portion 452 of the sidewall portion 451. The internal fibers 31 to 33 are further wired over the support plates 496, 497, and 439 to the rear wall portion 431, rotated by 180° along the inner surface of the fiber tray 40 over the support plate 429 to draw a semicircle, and then wired to the sidewall portion 411. It should be noted that the values of the radius of curvature of the internal fibers 31 to 33 are determined by their respective standards, and the internal fibers 31 to 33 are wired so that the bending radius is larger than the value of the radius of curvature when the internal fibers 31 to 33 are bent to draw a semicircle. For example, the internal fibers 31 to 33 may be wired so as to draw a semicircle as large as possible within a range of being able to house the internal fibers 31 to 33 inside the fiber tray 40. In the following description, "large rotation by 180°" means bending internal fibers to meet the requirement of the radius of curvature as described above.

The internal fibers 31 wire to the sidewall portion 411 passes over the support plate 419, and is guided to above the rib 471 following the side surface 471C, which is an inclined surface, of the rib 471. The internal fiber 31, which is guided to above the rib 471, rotates around the front side of the protrusion 444 largely by 180° to draw a semicircle. Then the internal fiber 31 is connected to the light source module 21 through the optical connector 31A at the tip. For example, the optical connector 31A and the light source module 21 are connected to be detachable.

The internal fiber 32 wired to the sidewall portion 411 passes over the support plate 419 and is guided to above the support plates 494 and 491, and the sleeve 32A provided on the tip of the internal fiber 32 is fitted into the recessed portion 461T.

The internal fiber 33 wired to the sidewall portion 411 passes over the support plate 419 and is guided to above the support plates 495 and 493, and the sleeve 33A provided on the tip of the internal fiber 33 is fitted into the recessed portion 461R.

The radius of curvature of the internal fibers 31 to 33 at the portion of rotating by 180° is greater than a predetermined radius of curvature that is set in advance in terms of losses of light, and is greater than 7.5 mm, for example.

In this manner, the internal fibers 31 to 33 are housed in the lower portion of the fiber tray 40.

Figure 17:
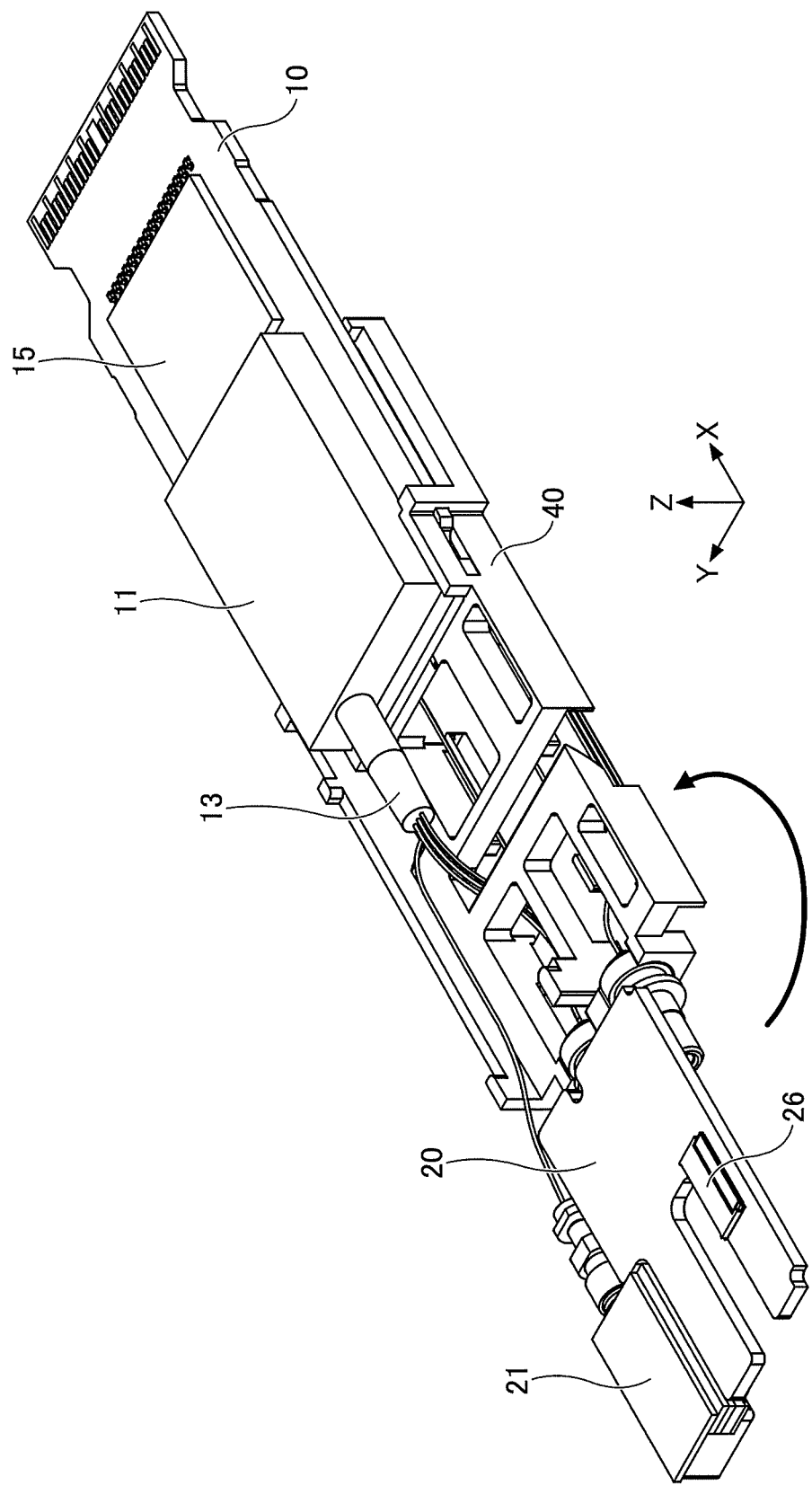
FIG. 17 is a perspective view (part 1) illustrating a method of assembling the optical transceiver.
Figure 18:
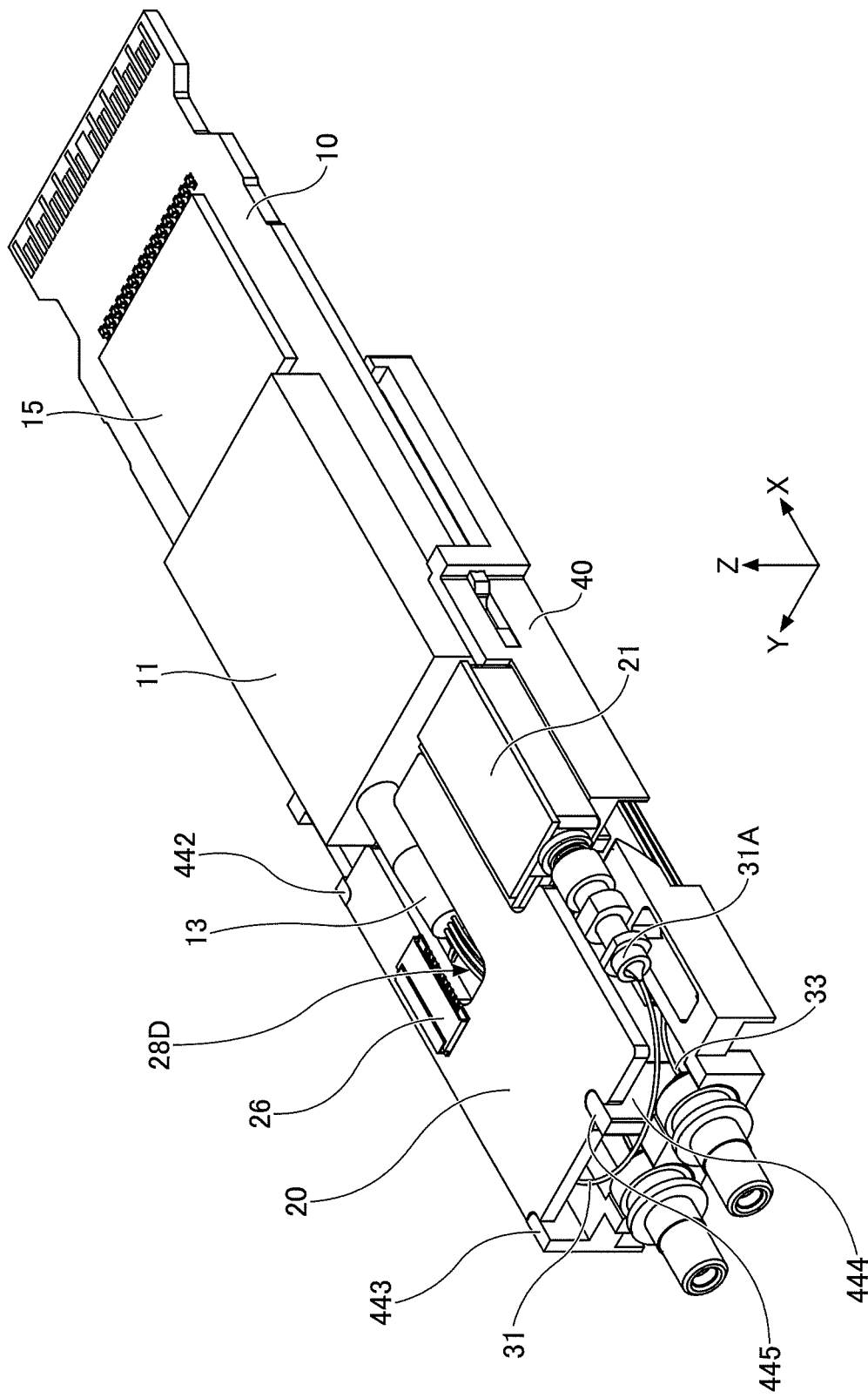
FIG. 18 is a perspective view (part 2) illustrating the method of assembling the optical transceiver.
Figure 19:
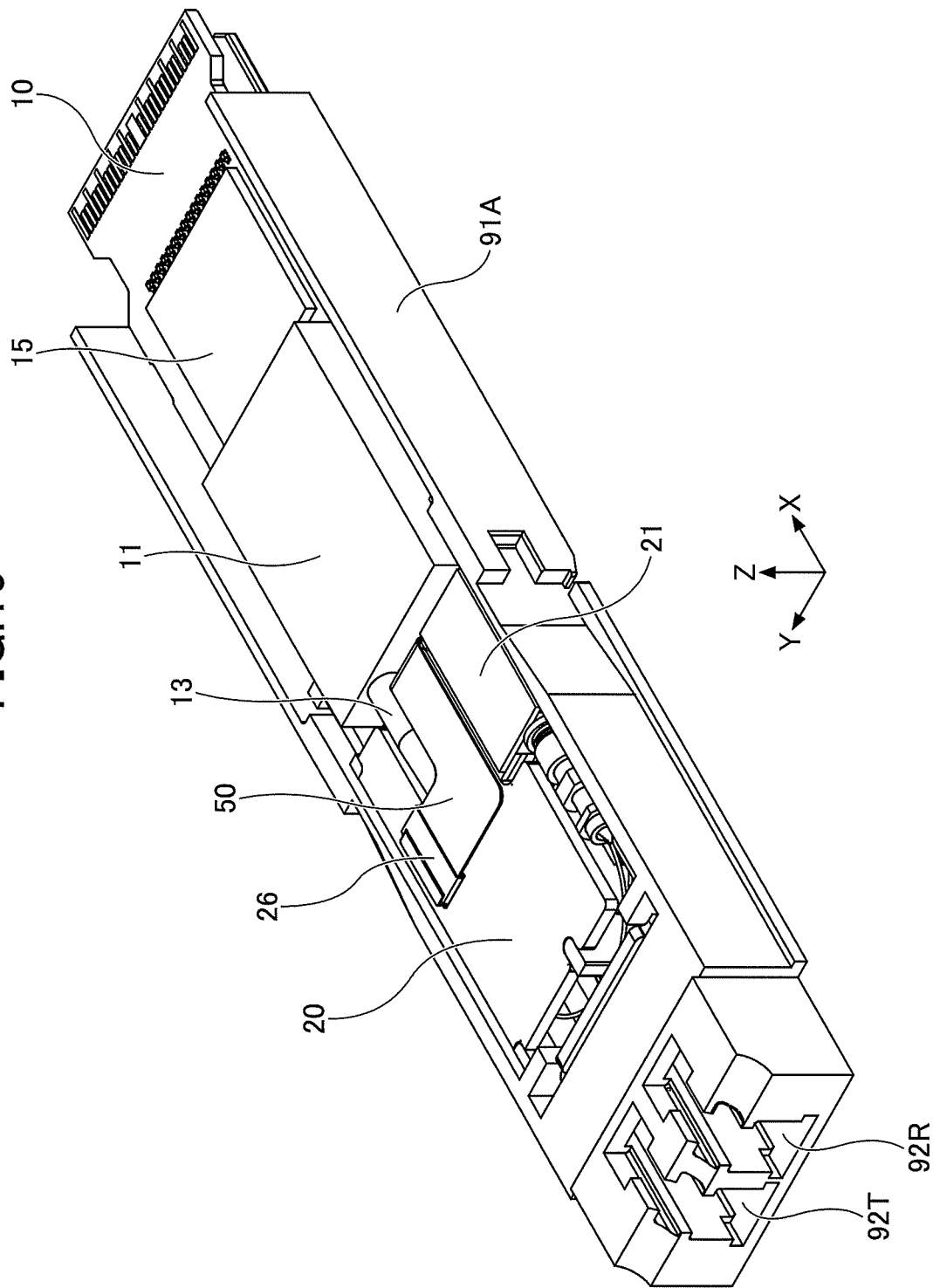
FIG. 19 is a perspective view (part 3) illustrating the method of assembling the optical transceiver.

Next, a method of assembling the optical transceiver 1 will be described. FIG. 17 to FIG. 19 are perspective views illustrating a method of assembling the optical transceiver 1.

First, as illustrated in FIG. 17, the IC-TROSA 11, the DSP 15, and the connector 16 are attached to the first wiring substrate 10, and the light source module 21, the light source control circuit 25, and the connector 26 are attached to the second wiring substrate 20. It should be noted that the IC-TROSA 11, the DSP 15, and the connector 16 may be attached in advance to the first wiring substrate 10 by surface-mount technology. The light source module 21 and the light source control circuit 25 may also be attached in advance to the second wiring substrate 20 by surface-mount technology. The first wiring substrate 10 is mounted on the fiber tray 40 such that its lower surface 10F is in contact with the upper surface 412A of the protrusion 412, the upper surface 414A of the protrusion 414, the upper surface 422A of the protrusion 422, and the upper surface 424A of the protrusion 424. Also, by snap-fitting, the fitting portion 18C is fixed to the fixing portion 413 and the fitting portion 18D is fixed to the fixing portion 423. The optical connector 31A is attached to the tip of the first internal fiber 31 of the IC-TROSA 11, the sleeve 32A is attached to the tip of the second internal fiber 32, and the sleeve 33A is attached to the tip of the third internal fiber 33. It should be noted that the optical connector 31A may be attached in advance to the first internal fiber 31 and the sleeves 32A and 33A may also be attached in advance respectively to the second internal fiber 32 and the third internal fiber 33. As described above, the internal fibers 31 to 33 are guided to below the rib 474 following the side surface 474C, which is an inclined surface, of the rib 474, and are housed in the lower portion of the fiber tray 40. The sleeve 32A is temporarily fixed to recessed portion 461T and the sleeve 33A is temporarily fixed to recessed portion 461R. The second wiring substrate 20 is held such that the output port 24 faces toward the rear side on the front side relative to the front wall portion 461 and the optical connector 31A is connected to the output port 24.

Then, the second wiring substrate 20 is rotationally moved with the position of the protrusion 444 as the center of rotation so as to pass above the sidewall portion 451 in the XY plane. As illustrated in FIG. 18, the second wiring substrate 20 is mounted on the fiber tray 40 such that its lower surface 20F is in contact with the upper surface 441A of the sidewall portion 441 and the upper surface 444A of the protrusion 444. Also, the protrusion 442 is fitted into recessed portion 28A, the protrusion 443 is fitted into recessed portion 28B, and the protrusion 445 is fitted into recessed portion 28C.

In FIG. 17 and FIG. 18, for convenience of description, illustration of the FPC50 is omitted, but one end of the FPC50 is connected to the connector 16 before the second wiring substrate 20 is fixed to the fiber tray 40, and the other end of the FPC50 is connected to the connector 26 after the second wiring substrate 20 is fixed to the fiber tray 40.

Thereafter, as illustrated in FIG. 19, the fiber tray 40 to which the first wiring substrate 10 and the second wiring substrate 20 are fixed is housed in the lower housing 91A. The sleeve 32A is fixed to the recessed portion 461T and the sleeve 33A is fixed to the recessed portion 461R within the lower housing 91A.

Subsequently, the slider 95 and the pull tab 96 are attached to the lower housing 91A, the upper housing 91B is fixed to the lower housing 91A, and the heat sink 94 is attached to the upper housing 91B (see FIG. 1). At this time, a heat radiation gel (not illustrated) may be provided between the downward inner surface of the upper housing 91B and the IC-TROSA 11 or the like.

In this manner, the optical transceiver 1 can be assembled. It should be noted that the distance between the upper surface of the IC-TROSA 11 and the upper housing 91B is preferably shorter in order to efficiently transfer heat generated by the IC-TROSA 11 to the heat sink 94. For this reason, the height from the bottom surface of the fiber tray 40 when the first wiring substrate 10 is supported by the first support portion 410 may be determined such that the upper surface of the IC-TROSA 11 and the downward inner surface of the upper housing 91B are in proximity to each other.

In the optical transceiver 1 according to the present embodiment, the first wiring substrate 10 on which the IC-TROSA 11 is mounted and the second wiring substrate 20 to which the light source module 21 is attached are mounted in the upper portion of the fiber tray 40, and the internal fibers 31 to 33 are housed in the lower portion of the fiber tray 40. Thus, the space in which the first wiring substrate 10 and the second wiring substrate 20 are mounted and the space in which the internal fibers 31 to 33 are housed can be separated in the Z axis direction. Also, in the X axis direction, the second wiring substrate 20 is arranged between the sleeves 32A and 33A and the first wiring substrate 10. For this reason, the portion of the internal fibers 31 to 33 extending from the side surface 12A and the second wiring substrate 20 can be arranged in line in the Y axis direction, and the dimension in the X axis direction can be reduced. Therefore, the optical transceiver 1 is suitable for reduction in size.

Furthermore, the second wiring substrate 20 to which the light source module 21 is attached can be separated from the first wiring substrate 10 on which the IC-TROSA 11 is mounted. Therefore, after the optical transceiver 1 is assembled, even in a case in which the light source module 21 is replaced during adjustment or inspection, such as wavelength setting, of the light source module 21, the light source module 21 can be replaced independently of the IC-TROSA 11. Accordingly, the productivity can be enhanced in comparison to a case in which the IC-TROSA 11 and the light source module 21 are attached to a common wiring substrate.

In the Z axis direction, the position of the first wiring substrate 10 and the position of the second wiring substrate 20 are different. Therefore, it is possible to align the upper surface of the package 12 of the IC-TROSA 11 and the upper surface of the light source module 21, and it is possible to efficiently use the space of the upper portion of the fiber tray 40.

The recessed portion 28D is formed in the side surface 20B of the second wiring substrate 20 and the internal fibers 31 to 33 bundled by the boot 13 are housed in the lower portion of the fiber tray 40 through the recessed portion 28D. Thus, it is possible to avoid interference between the internal fibers 31 to 33 and the second wiring substrate 20 at the upper portion of the fiber tray 40.

In the Y axis direction, the boot 13 of the IC-TROSA 11 and the light source module 21 are arranged in line. That is, the boot 13 and the light source module 21 are provided in the space of the upper portion of the fiber tray 40. Thus, it is possible to efficiently use the space of the upper portion of the fiber tray 40.

The light source module 21 includes the output port 24 on the side opposite to the first wiring substrate in the X axis direction. Therefore, interference between the output port 24 and the first internal fiber 31 and the first wiring substrate 10 can be avoided.

The internal fibers 31 to 33 guided by the rib 474 to the lower portion of fiber tray 40 are in proximity to the front wall portion 461, the sidewall portions 451 and 421, the rear wall portion 431, and the sidewall portion 411 in this order to be housed in the lower portion. For this reason, it is easy to greatly bend the internal fibers 31 to 33 to be housed in the lower portion of the fiber tray. For example, the internal fibers 31 to 33 are easily housed by being bent at a radius or curvature greater than, for example, 7.5 mm, which is a predetermined radius of curvature set in advance in terms of losses of light.

The fiber tray 40 includes, at the end portion on the side opposite to the cage of the host system in the X axis direction, the recessed portion 461T that holds the sleeve 32A and the recessed portion 461R that holds the sleeve 33A. Therefore, in this case, light can be transmitted and received on the side opposite to the cage of the host system. Thereby, the optical transceiver 1 is hot-pluggable to the cage of the host system in the longitudinal direction.

The optical connector 31A is provided on the end portion of the first internal fiber 31 connected to the light source module 21. For this reason, the first internal fiber 31 and the light source module 21 are easily optically coupled. Also, the IC-TROSA 11 and the light source module 21 can be detachably connected.

The DSP 15 is mounted on the first wiring substrate 10 to be located between the IC-TROSA 11 and an electrical socket of the cage of the host system, and the DSP 15 is electrically connected to the IC-TROSA 11. Therefore, the signal path between the IC-TROSA 11 and the cage of the host system cage can be shortened and signal losses can be suppressed.

Although the embodiment has been described in detail above, it is not limited to a specific embodiment. Various modifications and changes can be made within a scope set forth in the claims.

What is claimed is:

1. An optical transceiver that is hot-pluggable to an external device in a first direction, the optical transceiver comprising:
   an Integrated Coherent-Transmitter Receiver Optical Sub-Assembly including
      a package having a rectangular parallelepiped external shape;
      a first internal fiber;
      a second internal fiber;
      a third internal fiber; and
      an optical circuit element,
      wherein the package has a first surface on a side opposite to the device in the first direction,
      wherein the first internal fiber, the second internal fiber, and the third internal fiber extend from the first surface in proximity to each other,
      wherein the optical circuit element is housed inside the package, and
      wherein the Integrated Coherent-Transmitter Receiver Optical Sub-Assembly is configured to generate, based on reference light input through the first internal fiber, transmitted light to be output through the second internal fiber, and cause received light input through the third internal fiber to optically interfere with the reference light,
   a light source having a rectangular parallelepiped external shape, that is connected to the first internal fiber, and that is configured to generate the reference light;
   a first substrate having a rectangular parallelepiped external shape that is long in the first direction and having a second surface that is parallel to the first direction and a second direction, which is perpendicular to the first direction, the Integrated Coherent-Transmitter Receiver Optical Sub-Assembly being mounted on the second surface such that the first surface faces a side opposite to the device in the first direction;
   a second substrate having a third surface that is parallel to the first direction and the second direction and that is electrically connected to the light source and the first substrate, the light source being attached to the second substrate;
   a first sleeve provided on the second internal fiber and that is connectable to an external connector;
   a second sleeve provided on the third internal fiber and that is connectable to an external connector; and
   a fiber tray having a rectangular parallelepiped external shape that is long in the first direction and having an upper portion and a lower portion in a third direction perpendicular to the first direction and the second direction, the first substrate and the second substrate being mounted in the upper portion such that respective back surfaces of the second surface and the third surface face the lower portion, the first internal fiber, the second internal fiber, and the third internal fiber being housed in the lower portion in a state in which the first internal fiber, the second internal fiber, and the third internal fiber are bent at a radius of curvature greater than a predetermined radius of curvature,
   wherein the second substrate is arranged between sleeves, which are the first sleeve and the second sleeve, and the first substrate in the first direction.

2. The optical transceiver according to claim 1, wherein a position of the first substrate is different from a position of the second substrate in the third direction.

3. The optical transceiver according to claim 1,
   wherein the second substrate has a fourth surface facing the first surface, a cutout being formed on the fourth surface, and
   wherein the first internal fiber, the second internal fiber, and the third internal fiber are housed in the lower portion through the cutout.

4. The optical transceiver according to claim 1,
   wherein the Integrated Coherent-Transmitter Receiver Optical Sub-Assembly includes a boot that bundles the first internal fiber, the second internal fiber, and the third internal fiber, and
   wherein in the second direction the boot and the light source are arranged in line.

5. The optical transceiver according to claim 1, wherein the light source includes an output port on a side opposite to the first substrate in the first direction.

6. The optical transceiver according to claim 1,
   wherein the fiber tray includes
      a first wall portion and a second wall portion provided away from each other in the first direction and extending in the second direction;
      a third wall portion and a fourth wall portion provided away from each other in the second direction and extending in the first direction; and
      a guide portion provided between the first wall portion and the second wall portion and between the third wall portion and the fourth wall portion and guiding, to the lower portion, the first internal fiber, the second internal fiber, and the third internal fiber extending from the first surface at the upper portion,
   wherein the first internal fiber, the second internal fiber, and the third internal fiber guided to the lower portion by the guide portion are in proximity to the first wall portion, the third wall portion, the second wall portion, and the fourth wall portion in this order and are housed in the lower portion.

7. The optical transceiver according to claim 1, wherein the fiber tray includes, at an end portion on a side opposite to the device in the first direction,
a first holding portion that holds the first sleeve and
a second holding portion that holds the second sleeve.

8. The optical transceiver according to claim 1, further comprising:
an optical connector provided on an end portion of the first internal fiber connected to the light source.

9. The optical transceiver according to claim 1, further comprising:
a digital signal processing circuit that is mounted on the first substrate to be located between the Integrated Coherent-Transmitter Receiver Optical Sub-Assembly and the device and that is electrically connected to the Integrated Coherent-Transmitter Receiver Optical Sub-Assembly.

\* \* \* \* \*